(12) United States Patent
Hafenrichter et al.

(10) Patent No.: US 11,718,050 B2
(45) Date of Patent: Aug. 8, 2023

(54) SYSTEMS AND METHODS FOR ADHESIVE-INJECTED PATCH REPAIR

(71) Applicant: The Boeing Company, Chicago, IL (US)

(72) Inventors: Joseph L. Hafenrichter, Chicago, IL (US); Gary E. Georgeson, Chicago, IL (US); Marc J. Piehl, Chicago, IL (US)

(73) Assignee: The Boeing Company, Arlington, VA (US)

( * ) Notice: Subject to any disclaimer, the term of this patent is extended or adjusted under 35 U.S.C. 154(b) by 36 days.

(21) Appl. No.: 17/551,322

(22) Filed: Dec. 15, 2021

(65) Prior Publication Data

US 2022/0194032 A1    Jun. 23, 2022

Related U.S. Application Data

(60) Provisional application No. 63/126,910, filed on Dec. 17, 2020.

(51) Int. Cl.
| | |
|---|---|
| *B29C 73/24* | (2006.01) |
| *B29C 73/02* | (2006.01) |
| *B29L 31/30* | (2006.01) |

(52) U.S. Cl.
CPC ............ *B29C 73/025* (2013.01); *B29C 73/24* (2013.01); *B29L 2031/3076* (2013.01)

(58) Field of Classification Search
CPC .................................................. B29C 73/025
See application file for complete search history.

(56) References Cited

U.S. PATENT DOCUMENTS

| | | |
|---|---|---|
| 2006/0243382 A1 | 11/2006 | Kilwin et al. |
| 2014/0216634 A1* | 8/2014 | Hanks ...................... B29C 73/10 156/578 |
| 2021/0316837 A1 | 10/2021 | Hafenrichter et al. |

FOREIGN PATENT DOCUMENTS

| | | | |
|---|---|---|---|
| CN | 109940906 A | * | 6/2019 |
| WO | WO-2012/154544 A2 | * | 11/2012 |

OTHER PUBLICATIONS

United States Patent Application Serial No. filed Dec. 15, 2021, entitled "Systems and Methods for Evacuated Injection Repair of Bondline Voids".
United States Patent Application Serial No. filed Dec. 15, 2021, entitled "Systems and Methods for Sealing a Bond Cavity Between Structural Components".
Extended European Search Report prepared by the European Patent Office in application No. EP 21 21 0872.4 dated Jun. 6, 2022.

* cited by examiner

*Primary Examiner* — Jeffry H Aftergut
(74) *Attorney, Agent, or Firm* — McDonnell Boehnen Hulbert & Berghoff LLP

(57) ABSTRACT

In an example, a method is described. The method comprises placing a repair patch over a repair area of a structure, the repair patch comprising a repair-patch hole. The method also comprises sealing the repair patch and repair area with a vacuum bag having a seal ring around a periphery of the vacuum bag. The method also comprises evacuating, via an adhesive injection apparatus attached to the repair-patch hole and the seal ring of the vacuum bag, the repair area and an injection channel of the adhesive injection apparatus. The method also comprises forcing adhesive through the evacuated injection channel and into the evacuated repair area.

20 Claims, 26 Drawing Sheets

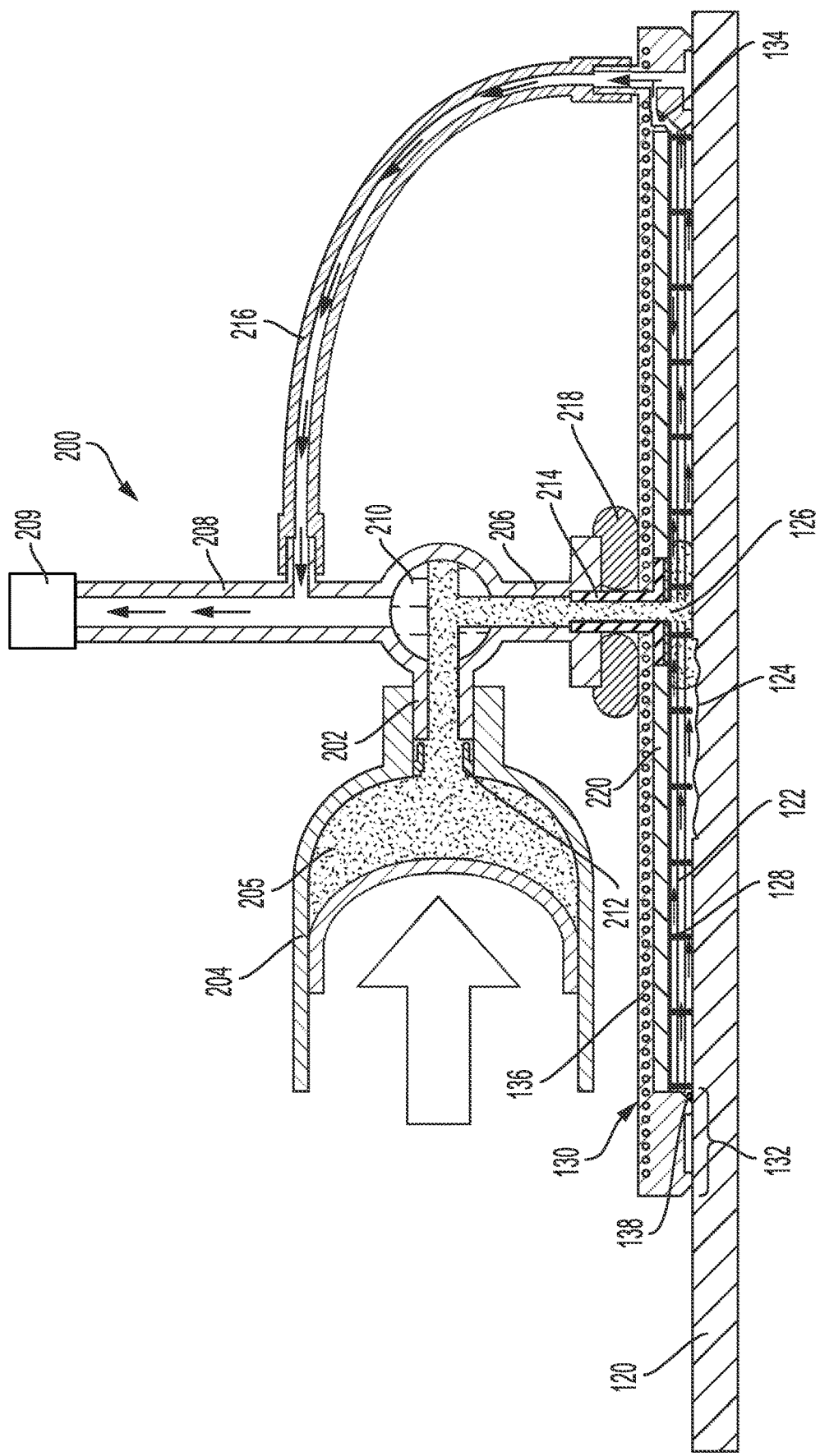

SYSTEMS AND METHODS FOR ADHESIVE-INJECTED PATCH REPAIR

CROSS-REFERENCE TO RELATED APPLICATIONS

The present disclosure claims priority to U.S. Provisional Application No. 63/126,910, filed on Dec. 17, 2020, the entire contents of which are herein incorporated by reference.

FIELD

The present disclosure relates generally to repairing a surface of a structure, and more particularly, to repairing a surface using patch repair.

BACKGROUND

In aircraft and other environments, patch repair is a technique that is often used to repair corroded or otherwise damaged composite and metal structures. For example, a damaged surface is located and a bonded or doubler-type patch is attached to the damaged surface using an adhesive. However, existing techniques for patch repair are often complex, labor intensive, and time consuming.

In addition, existing techniques for patch repair often produce undesirable bondlines between a patch and the structure. For example, when placing adhesive in the void between the patch and the surface of the structure, air can become trapped in the void, thus creating residual voids in the bondline in which less or no adhesive is present. These residual voids can reduce the intended strength properties of the patch and thus reduce the effectiveness of the repair. Depending on the extent of the residual voids, a supplemental repair process is then performed to fill the voids or the entire patch repair is performed again, thus requiring additional time and labor.

What is needed is a less time consuming, less labor intensive, and more reliable technique for producing desirable bondlines (e.g., bondlines without residual voids) when performing patch repair on the surface of a structure.

SUMMARY

In an example, a method is described. The method comprises placing a repair patch over a repair area of a structure, the repair patch comprising a repair-patch hole. The method also comprises sealing the repair patch and repair area with a vacuum bag having a seal ring around a periphery of the vacuum bag. The method also comprises evacuating, via an adhesive injection apparatus attached to the repair-patch hole and the seal ring of the vacuum bag, the repair area and an injection channel of the adhesive injection apparatus. The method also comprises forcing adhesive through the evacuated injection channel and into the evacuated repair area.

In another example, an adhesive injection apparatus is described. The adhesive injection apparatus comprises a transfer channel configured to be fluidly coupled to an adhesive reservoir. The adhesive injection apparatus also comprises an injection channel configured to be fluidly coupled to a repair area. The adhesive injection apparatus also comprises an evacuation channel configured to be fluidly coupled to a vacuum source. The adhesive injection apparatus also comprises a seal actuation tube configured to be fluidly coupled to the evacuation channel and a seal ring around a periphery of a vacuum bag, wherein the vacuum bag is used to seal a repair patch and the repair area. The adhesive injection apparatus also comprises a three-way valve disposed between the transfer channel, the injection channel, and the evacuation channel and selectively operable to establish fluid communication between the evacuation channel and the injection channel, between the evacuation channel and the transfer channel, and between the transfer channel and the injection channel.

In another example, a repair area repaired by a process is described. The process comprises placing a repair patch over a repair area of a structure, the repair patch comprising a repair-patch hole. The process also comprises sealing the repair patch and repair area with a vacuum bag having a seal ring around a periphery of the vacuum bag. The process also comprises evacuating, via an adhesive injection apparatus attached to the repair-patch hole and the seal ring of the vacuum bag, the repair area and an injection channel of the adhesive injection apparatus. The process also comprises forcing adhesive through the evacuated injection channel and into the evacuated repair area.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIGS. 4A-4M illustrate cross-sectional views of example stages of another process for adhesive-injected patch repair of a structure, according to an example implementation.

DETAILED DESCRIPTION

Figures 1A, 1B:
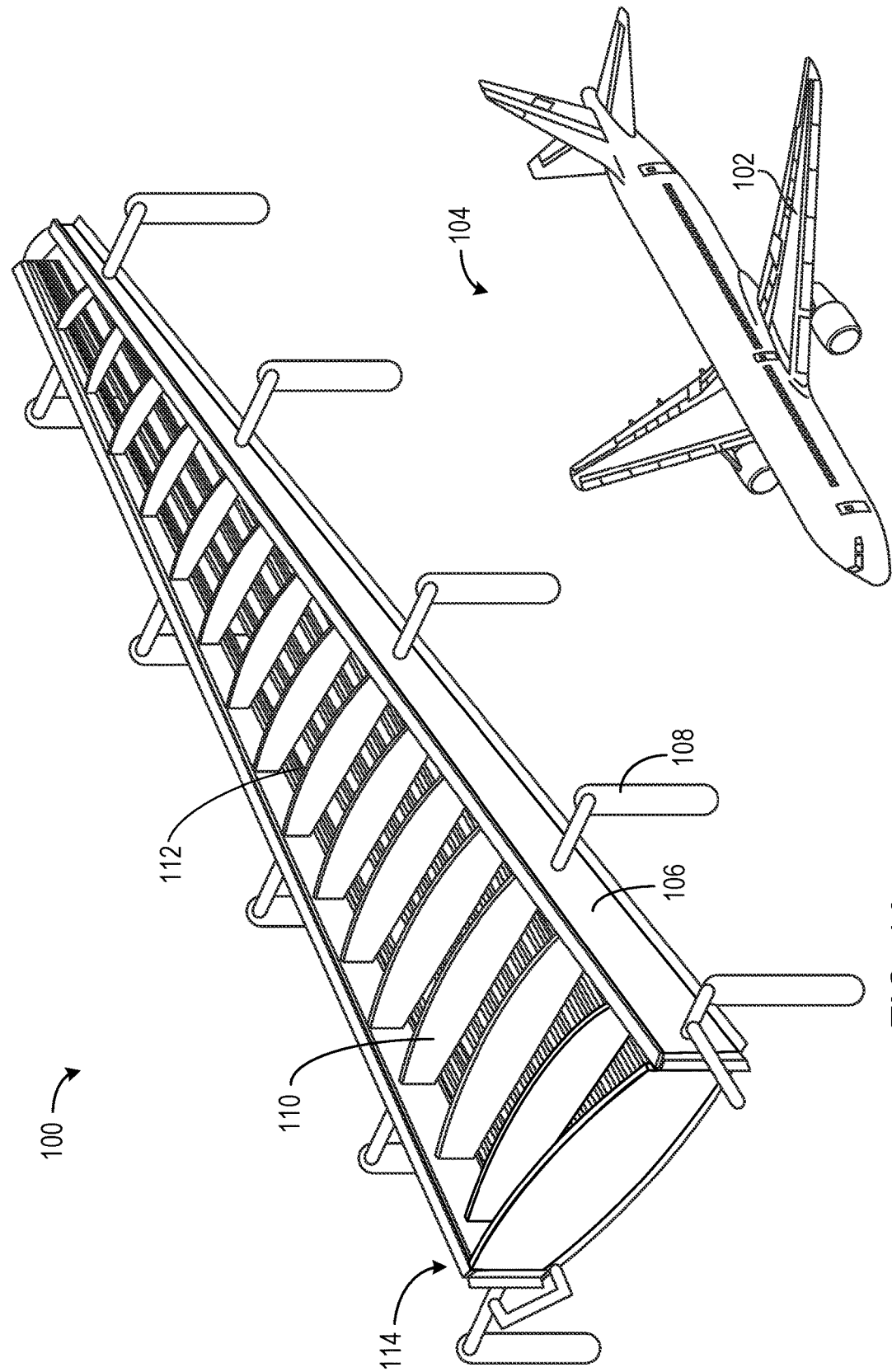
FIG. 1A illustrates a system for forming a bonded wing of an aircraft, according to an example implementation.
FIG. 1B illustrates an example of the aircraft including the bonded wing, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

By the terms "substantially," "about," "approximately," and "proximate" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Unless otherwise specifically noted, elements depicted in the drawings are not necessarily drawn to scale.

The disclosed methods and systems will be primarily discussed in the context of repairing a surface of a structure in an aircraft (e.g., a composite or metal structure), but the disclosed methods and systems can also implemented with respect to repairing other types of structures as well, in environments other than aircrafts. In the context of aircrafts, the disclosed methods and systems can be used during structural maintenance of aircraft structures, such as to address structure damage to a wing or other component of the aircraft, for instance. Additionally or alternatively, the disclosed methods and systems can be used during the production of the aircraft, such as during the production of a bonded wing of the aircraft.

Within examples, described herein are methods and systems for adhesive-injected patch repair of a structure. A repair patch, having a repair-patch hole, is placed over a repair area of a structure. The repair patch can take the form of a pre-cured composite patch, or a patch comprised of multiple layers of material separated by bondline spacers (e.g., micro-beads). Within examples, the material of the layers is sheet metal, polymer, and/or composite material. The repair patch and the repair area are sealed with a vacuum bag having a seal ring around a periphery of the vacuum bag. An adhesive injection apparatus is attached to the repair-patch hole and the seal ring of the vacuum bag. The repair area and an injection channel of the adhesive injection apparatus are then evacuated via the adhesive injection apparatus. Once the repair area and the injection channel of the adhesive injection apparatus are evacuated, adhesive is forced through the evacuated injection channel and into the repair area between the repair patch and the surface of the structure. When a multi-layer patch is used, the adhesive is also forced between the layers. After the adhesive fills the repair area, the adhesive can be cured. For example, the adhesive can be cured by using heating elements embedded in the vacuum bag. In another example, the adhesive can be a type of adhesive that cures at room temperature.

To facilitate this process, the adhesive injection apparatus includes three channels and a three-way valve. In particular, the adhesive injection apparatus includes a transfer channel configured to be fluidly coupled to an adhesive reservoir, an injection channel configured to be fluidly coupled to the repair area, an evacuation channel configured to be fluidly coupled to a vacuum source, and a seal actuation tube configured to be fluidly coupled to the evacuation channel and the seal ring around a periphery of the vacuum bag. The three-way valve is disposed between the transfer channel, the injection channel, and the evacuation channel, and the three-way valve is selectively operable to establish fluid communication between the evacuation channel and the injection channel, between the evacuation channel and the transfer channel, and between the transfer channel and the injection channel.

To evacuate the repair area, the three-way valve is positioned to establish fluid communication between the evacuation channel and the injection channel and the vacuum source is used to remove air from the repair area before adhesive is injected. Because the seal actuation tube is fluidly coupled to the evacuation channel, the vacuum source also removes air from the repair area via the seal actuation tube. The three-way valve is then positioned to establish fluid communication between the evacuation channel and the transfer channel and the vacuum source is used to remove air from the transfer channel. The three-way valve is then positioned to establish fluid communication between the transfer channel and the injection channel and the adhesive is forced out of the adhesive reservoir, through the transfer channel and the injection channel, and into the repair area. Within examples, the vacuum source removes air from the repair area via the seal actuation tube during at least a portion of the time when the adhesive is being forced into the repair area.

With the air removed from the transfer channel and the repair area before the adhesive is injected, there can be fewer air molecules or no air molecules in the transfer channel and the repair area to resist the adhesive filling the repair area. As a result, the frequency of residual voids appearing in the repair area can be reduced, which can reduce or eliminate the need for spending additional time and labor on remedying any deficiencies in the first attempt at patch repair. Thus, the disclosed methods and apparatus efficiently create a desirable bondline between the repair patch and the structure, the bondline having a desirable structural capacity. In addition, the adhesive injection apparatus can act as a single device used for both evacuation and injection, which can reduce or eliminate the need for additional, separate devices for performing the evacuation and injection.

These and other improvements are described in more detail below. Implementations described below are for purposes of example. The implementations described below, as well as other implementations, may provide other improvements as well.

FIG. 1A illustrates a system 100 for forming a bonded wing 102 of an aircraft 104, according to an example implementation. FIG. 1B illustrates an example of the aircraft 104 including the bonded wing 102.

The system 100 includes a plurality of spars 106, which are held in place by a plurality of fixture arms 108. The plurality of fixture arms 108 are not included in the assembled wing, but are rather provided for purposes of assembly. Other fixtures or tools can be used for holding aspects of the system 100 in place during assembly. The system 100 further includes a plurality of wing ribs 110, which are attached between the spars 106. The system 100 further includes a plurality of longerons 112 (also known as "stringers", in some examples), which run parallel to the spars 106, and which provide an interface between the wing ribs 110 and other aspects of the system 100. The longerons 112 may provide a flexibility and strength to the system 100.

The spars 106 can collectively form a portion of a wing box 114 that provides lateral structure to the system 100, and which provides a general shape and dimension of the system 100. Further, additional components of the system 100 may couple to the wing box 114. Accordingly, the dimensions of the spars 106 may strictly adhere to design plans for the wing 102. For similar reasons, holes in the spars 106 may be close tolerance holes, and therefore can fit the corresponding fasteners in accordance with a given accuracy level (e.g., within 1% of the diameter of the fastener).

Figure 2:
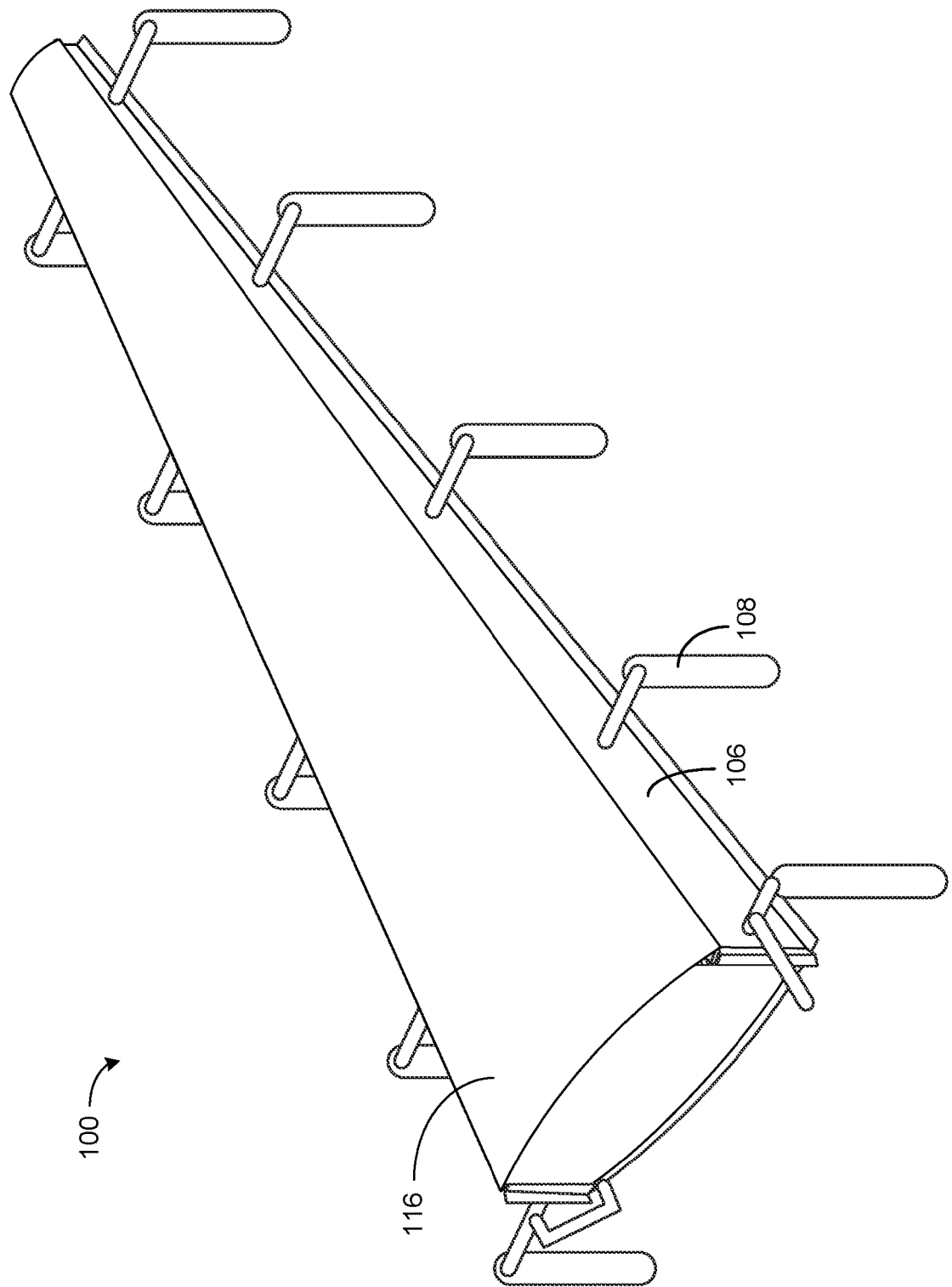
FIG. 2 illustrates the system with a portion of a wing skin coupled or bonded to the spars, the wing ribs, and the longerons, according to an example implementation.

FIG. 2 illustrates the system 100 with a portion of a wing skin 116 coupled or bonded to the spars 106, the wing ribs 110, and the longerons 112, according to an example implementation. By coupling the wing skin 116 to a component of the wing (e.g., the spars 106, the wing ribs 110, and the longerons 112), the bonded wing 102 is formed.

FIGS. 3A-3L illustrate cross-sectional views of example stages of a process for adhesive-injected patch repair of a structure 120 with a repair patch 122, according to an example implementation. In particular, FIGS. 3A-3L illustrate cross-sectional views of structure 120, repair patch 122, vacuum bag 130, and/or adhesive injection apparatus 200 during various stages of the process for adhesive-injected patch repair of structure 120. In FIGS. 3A-3L, the repair patch 122 takes the form of a pre-cured composite patch. An example of the structure 120 can include a component of the wing 102 of the aircraft 104, such as one of the longerons 112 or the wing skin 116. The structure 120 can be or include another component of the wing 102 or another component of the aircraft 104 as well. Further, the structure 120 can be a structure in another type of vehicle or a type of structure that is used in contexts other than vehicles.

Figure 3A:
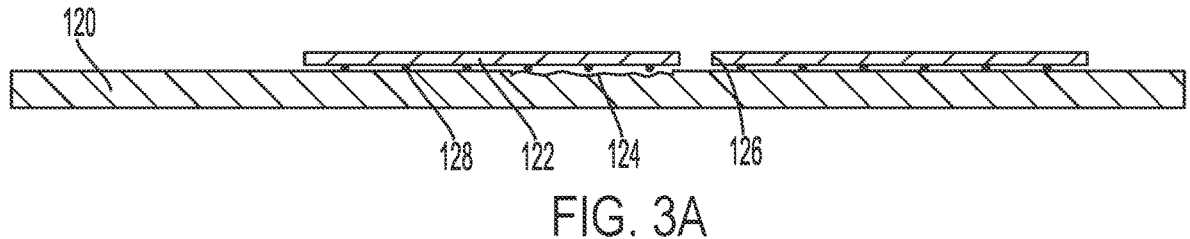
FIGS. 3A-3L illustrate cross-sectional views of example stages of a process for adhesive-injected patch repair of a structure, according to an example implementation.

FIG. 3A illustrates an initial stage in the process in which the repair patch 122 is placed over a repair area 124 of the structure 120. The repair area 124 can refer to a region of the structure 120 that is damaged, along with the surrounding area bounded by the vacuum bag (e.g., vacuum bag 130, introduced in FIG. 3B), including the area in which the repair patch 122 is placed and the area that the adhesive occupies after adhesive injection is complete. Within examples, the repair area 124 is an indentation in the structure 120.

As shown, the repair patch 122 has a repair-patch hole 126. The repair patch 122 is placed over a plurality of bondline spacers 128 (shown as circular objects in FIGS. 3A-3H, as a representative example), which are positioned between the repair patch 122 and the structure 120. The plurality of bondline spacers 128 are configured to maintain a desired gap between the repair patch 122 and the structure 120, and can take various forms, such as micro-balloons. An example thickness of the plurality of bondline spacers 128 is 0.01 inches, in which case the desired gap between the repair patch 122 and the structure 120 would be approximately 0.01 inches as well. Another example thickness of the plurality of bondline spacers 128 and the desired gap is 0.025 inches. Other examples are possible as well.

Figure 3B:
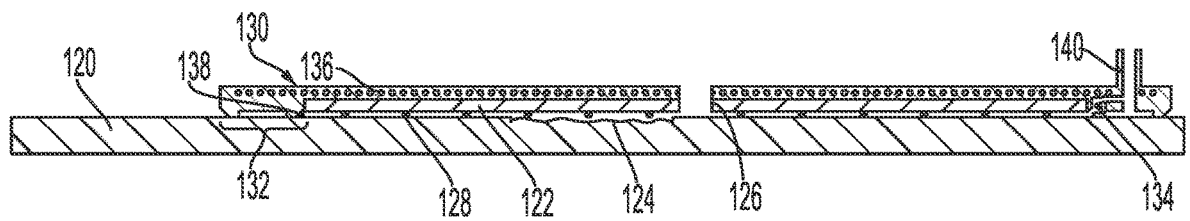

FIG. 3B illustrates a next stage in which the repair patch 122 and the repair area 124 are sealed with a vacuum bag 130 having a seal ring 132 around a periphery of the vacuum bag 130. In an example, the seal ring 132 is contiguous around the periphery of the vacuum bag 130. Within examples, the seal ring comprises a circular or polygonal shape. Within examples, the shape of the seal ring 132 is selected based on the shape of the repair area 124, so that the seal ring 132 surrounds the repair area 124. The vacuum bag 130 also has a float valve 134 that is configured to prevent injected adhesive from flowing into the seal ring 132. In addition, a plurality of heating elements 136 (shown as circular objects in FIGS. 3B-3J, as a representative example) are embedded in the vacuum bag 130. The plurality of heating elements 136 can take various forms, such as portions (e.g., strips) of silicon rubber or portions of other types of resistance heat blankets, and can have varying shapes and sizes depending on the size and shape of the vacuum bag 130 and/or the size and shape of the repair area 124. Other examples of the plurality of heating elements 136 are possible as well.

Having the seal ring 132 and the plurality of heating elements 136 integrated with the vacuum bag 130 as shown in the Figures herein can make repairing the repair area 124 more efficient and less complex. Optionally, the seal ring 132 and/or the plurality of heating elements 136 might be physically separate from the vacuum bag 130—that is, not integrated with the vacuum bag 130.

Optionally, a fill sensor 138 can be disposed proximate to the seal ring 132. As shown, for example the fill sensor 138 can be attached to the seal ring 132 at a location at or near an inner circumferential surface of the seal ring 132, such that the adhesive, while filling the gap between the repair patch 122 and the structure 120, reaches the fill sensor 138 before or at approximately the same time as the float valve 134. Other examples are possible as well. The fill sensor 138 can take various forms, including but not limited to a radio frequency identification (RFID) tag configured to modulate frequency response based on the adhesive contacting the RFID tag, a piezo electric sensor configured to change a response as the adhesive moves toward the piezo electric sensor and based on the adhesive contacting the piezo electric sensor, a capacitive sensor configured to respond to adjacent adhesive within close proximity to the capacitive sensor, a conductive sensor configured to respond to adhesive wetting and resulting conductivity changes by contact, and a resistive sensor configured to respond to adhesive wetting and resulting resistance changes by contact. Upon detecting that the adhesive is approaching or has contacted the fill sensor 138, the fill sensor 138 can be configured to send a signal to an external device, such as a computer that autonomously controls injection of the adhesive, to indicate to the external device that the adhesive has filled the repair area 124. And upon receiving the signal, the external device might perform one or more responsive actions, such as discontinuing forcing the adhesive into the repair area 124.

Figure 3C:
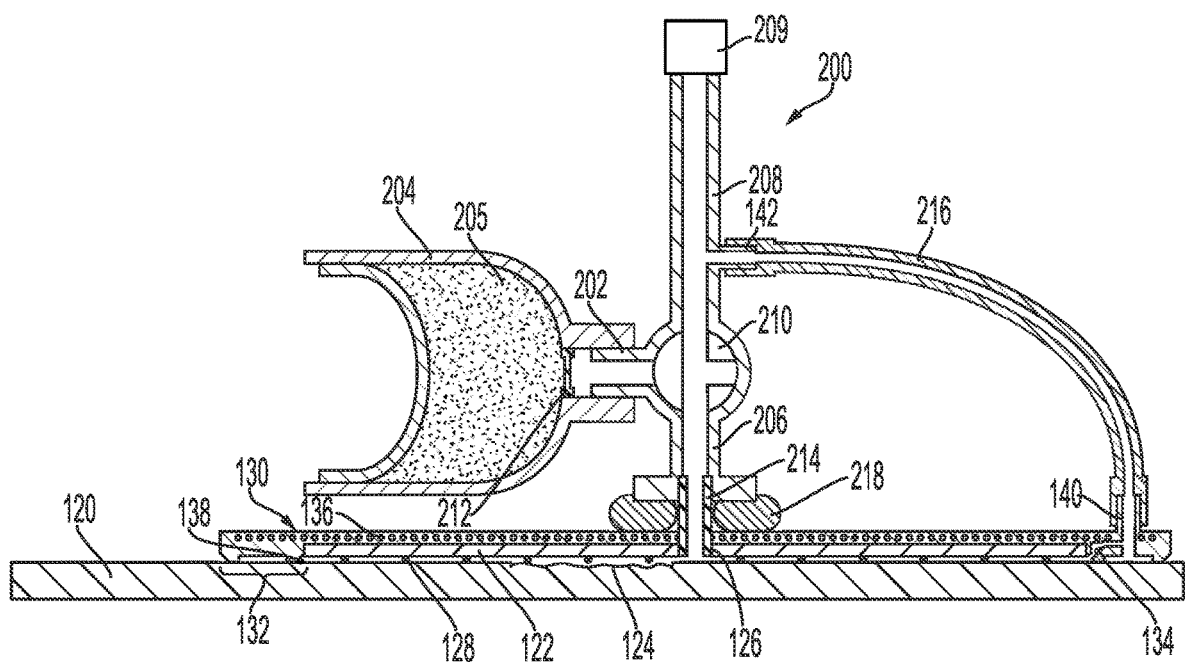

FIG. 3C illustrates a next stage in which an adhesive injection apparatus 200 is attached to the repair-patch hole 126.

The adhesive injection apparatus 200 includes a transfer channel 202 configured to be fluidly coupled to an adhesive reservoir 204 that contains adhesive 205. In an example, the adhesive injection apparatus 200 includes the adhesive reservoir 204. In another example, the adhesive injection apparatus 200 is attached to the adhesive reservoir. In some examples, the adhesive 205 is a de-aerated adhesive (e.g., adhesive paste with bubbles evacuated or air evacuated), although other types of adhesive can be used in other examples.

The adhesive injection apparatus 200 also includes an injection channel 206 configured to be fluidly coupled to the repair area 124. The adhesive injection apparatus 200 also includes an evacuation channel 208 configured to be fluidly coupled to a vacuum source 209. Further, the adhesive injection apparatus 200 includes a three-way valve 210 disposed between, and fluidly coupled to, the transfer channel 202, the injection channel 206, and the evacuation channel 208. The three-way valve 210 is selectively operable to establish fluid communication between the evacuation channel 208 and the injection channel 206, between the evacuation channel 208 and the transfer channel 202, and between the transfer channel 202 and the injection channel 206. Still further, the adhesive injection apparatus 200 includes a frangible seal 212 proximal to and separating the adhesive reservoir 204 from the transfer channel 202. The frangible seal 212 prevents air from entering the adhesive reservoir 204.

The injection channel 206 terminates in an injection tip 214 that can be inserted into the repair-patch hole 126, to facilitate the injection channel 206 being fluidly coupled to the repair area 124. Alternatively, the injection tip 214 can be placed over or otherwise attached to the repair-patch hole 126. Other methods and structures can be used in alternative examples for fluidly coupling the adhesive injection apparatus 200 to the repair area 124.

The adhesive injection apparatus 200 also includes a seal actuation tube 216 configured to be fluidly coupled to the seal ring 132 and the evacuation channel 208. As shown, the seal ring 132 includes a protrusion 140 to which one end of the seal actuation tube 216 can be coupled and a chamber disposed in the seal ring 132 via which the seal actuation tube 216 facilitates evacuation of the repair area 124. The evacuation channel 208 includes a protrusion 142 as well, to which the other end of the seal actuation tube 216 can be coupled. Other methods and structures can be used in alternative examples for fluidly coupling the adhesive injection apparatus 200 and the seal ring 132. In some examples, for instance, the seal actuation tube 216 can be alternatively coupled to the injection channel 206.

In alternative examples, the seal actuation tube 216 is optional, and the adhesive injection apparatus 200 might not be attached to the seal ring 132. In such examples, evacuation of the repair area 124 can occur only through the injection channel 206.

As further shown in FIG. 3C, vacuum seal tape 218 is used to seal the adhesive injection apparatus 200 against the vacuum bag 130. The vacuum seal tape 218 can provide additional help in facilitating evacuating all the air from the repair area 124. In an example, the vacuum seal tape 218 is attached before evacuating the repair area 124 and the injection channel 206.

Figure 3D:
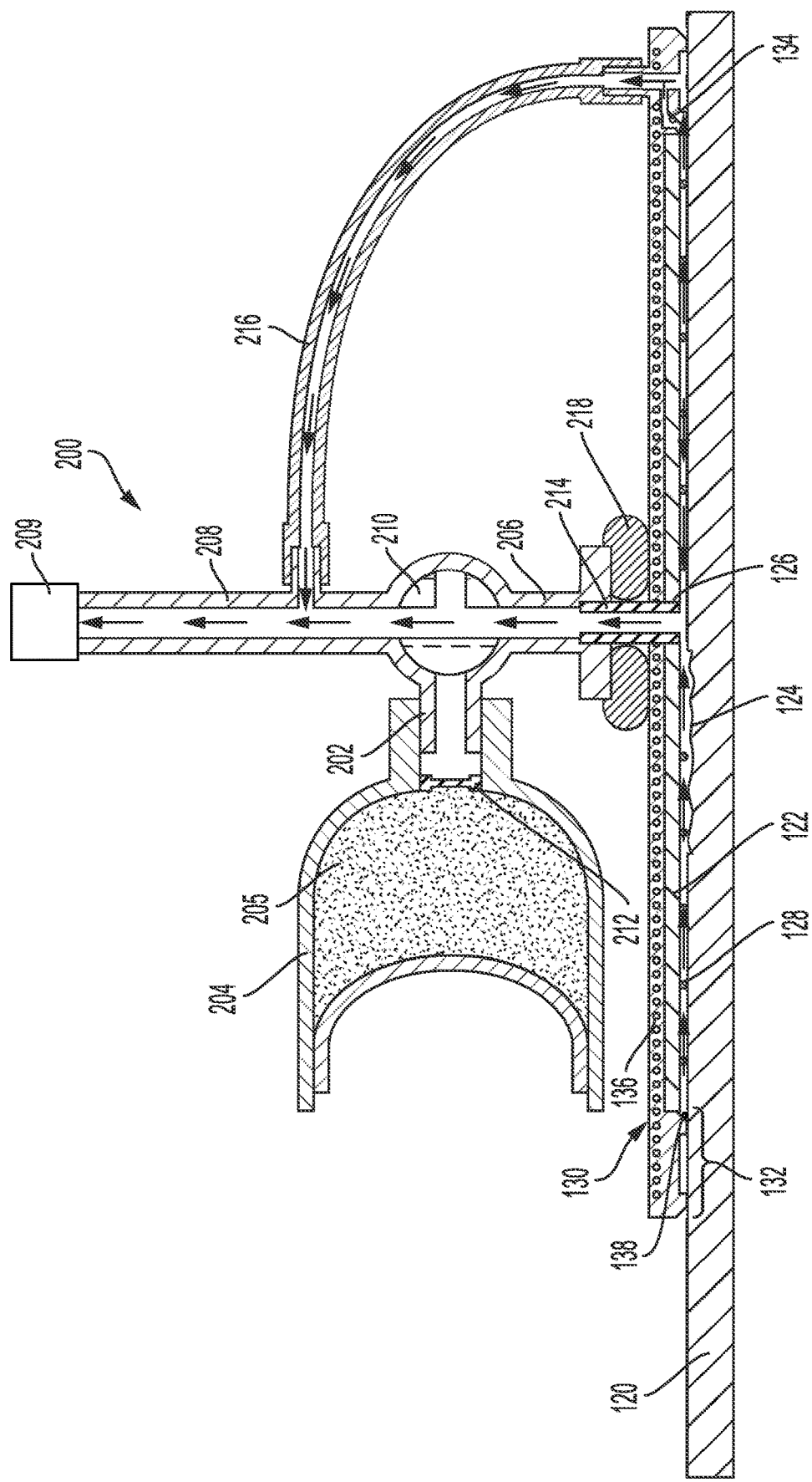

FIG. 3D illustrates a next stage in which the adhesive injection apparatus 200 is used to evacuate the repair area 124 and the injection channel 206 of the adhesive injection apparatus 200. To facilitate this, the three-way valve 210 can be positioned as shown in FIG. 3D to establish fluid communication between the evacuation channel 208 and the injection channel 206, thus allowing for the vacuum source 209 to be turned on and used to evacuate the injection channel 206 and the repair area 124. Air is thus evacuated through the injection channel 206 and the seal actuation tube 216. Arrows are shown to illustrate the air drawn out of the injection channel 206 and the repair area 124. Further, by drawing air through the seal actuation tube 216, the seal ring 132 engages with the structure 120. That is, drawing air causes the seal ring 132 to activate such that it seals against the structure 120 to which it applies.

Figure 3E:
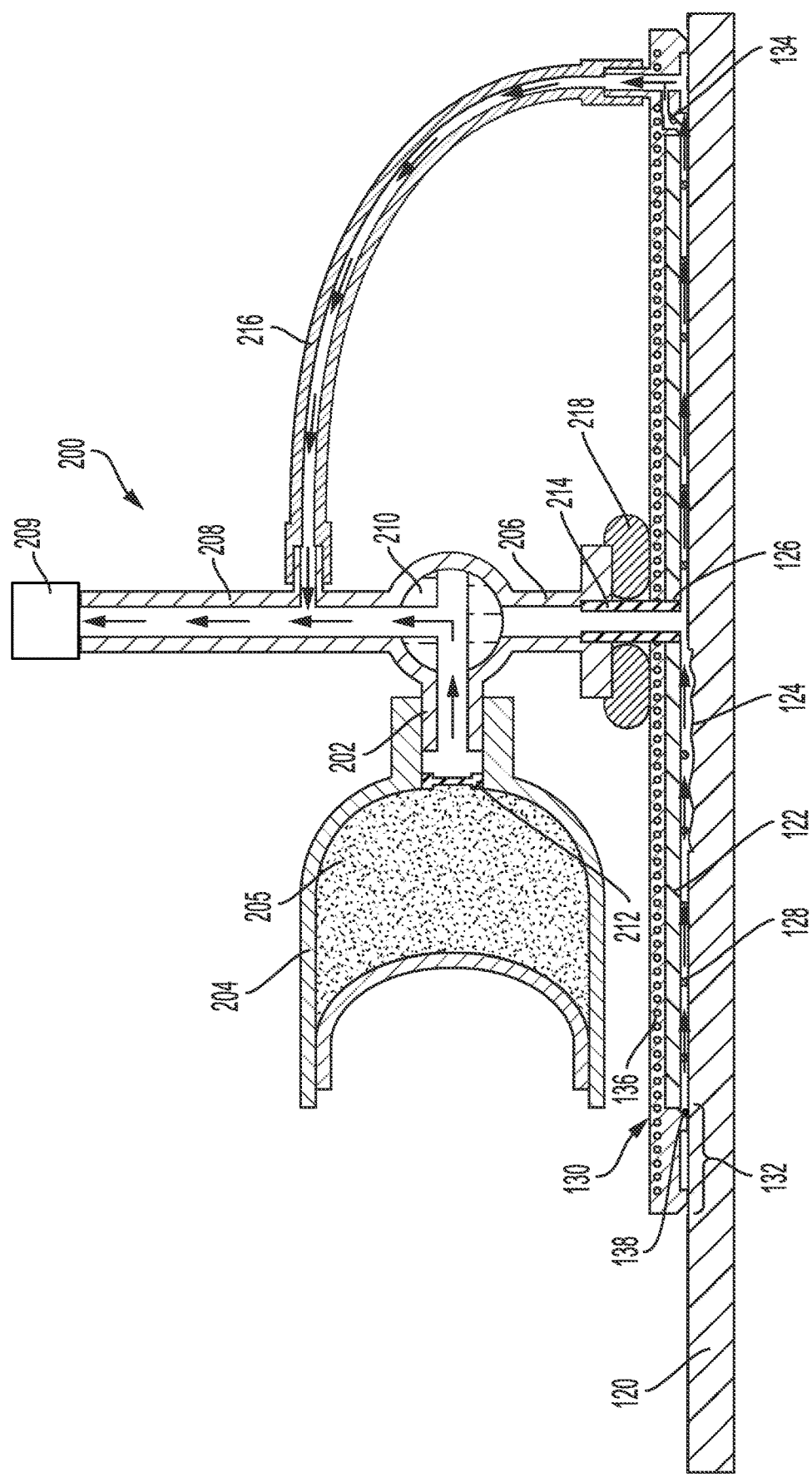

FIG. 3E illustrates a next stage in which the adhesive injection apparatus 200 is used to evacuate the transfer channel 202. To facilitate this, the three-way valve 210 can be positioned as shown in FIG. 3E to establish fluid communication between the evacuation channel 208 and the transfer channel 202. In some examples, this can be done before or after the stage illustrated in FIG. 3D. Alternatively, the three-way valve 210 can be positioned (i.e., rotated approximately 90 degrees counterclockwise from the position shown in FIG. 3E) to establish fluid communication between the evacuation channel 208, the injection channel 206, and the transfer channel 202, thus allowing for the vacuum source 209 to be turned on and used to evacuate the injection channel 206, the transfer channel 202, and the repair area 124 at substantially the same time. As further shown, air can continue to be evacuated out of the repair area 124 via the seal actuation tube 216 at substantially the same time as the transfer channel 202 is being evacuated. In one example, the position of the three-way valve 210 can be changed manually by a human operator. In another example, the position of the three-way valve 210 can be changed by a robotic device.

Figure 3F:
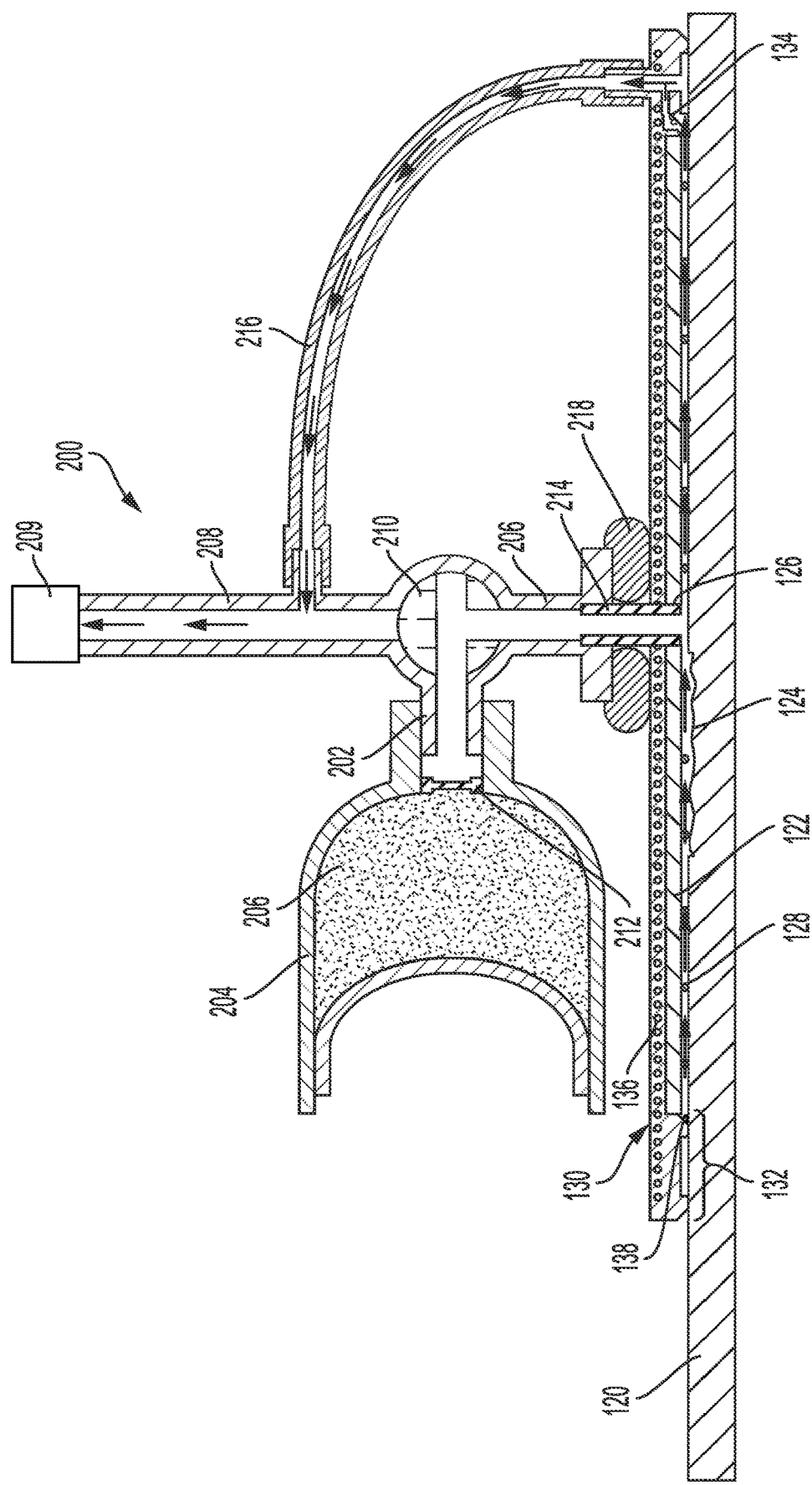

FIG. 3F illustrates a next stage in which the adhesive injection apparatus 200 is prepared for injection of the adhesive 205 into the repair area 124. To facilitate this, the three-way valve 210 can be positioned as shown in FIG. 3F to establish fluid communication between the evacuated transfer channel 202 and the evacuated injection channel 206. Optionally, the vacuum source 209 can be used to continue to draw air out of the repair area 124 during this stage and/or during one or more other stages in which the adhesive 205 is being injected into the repair area 124, such as the stages shown in FIGS. 3G-3J. In this stage and such other stages, arrows are shown to illustrate the air drawn out of the repair area 124 via the seal actuation tube 216.

Figure 3G:
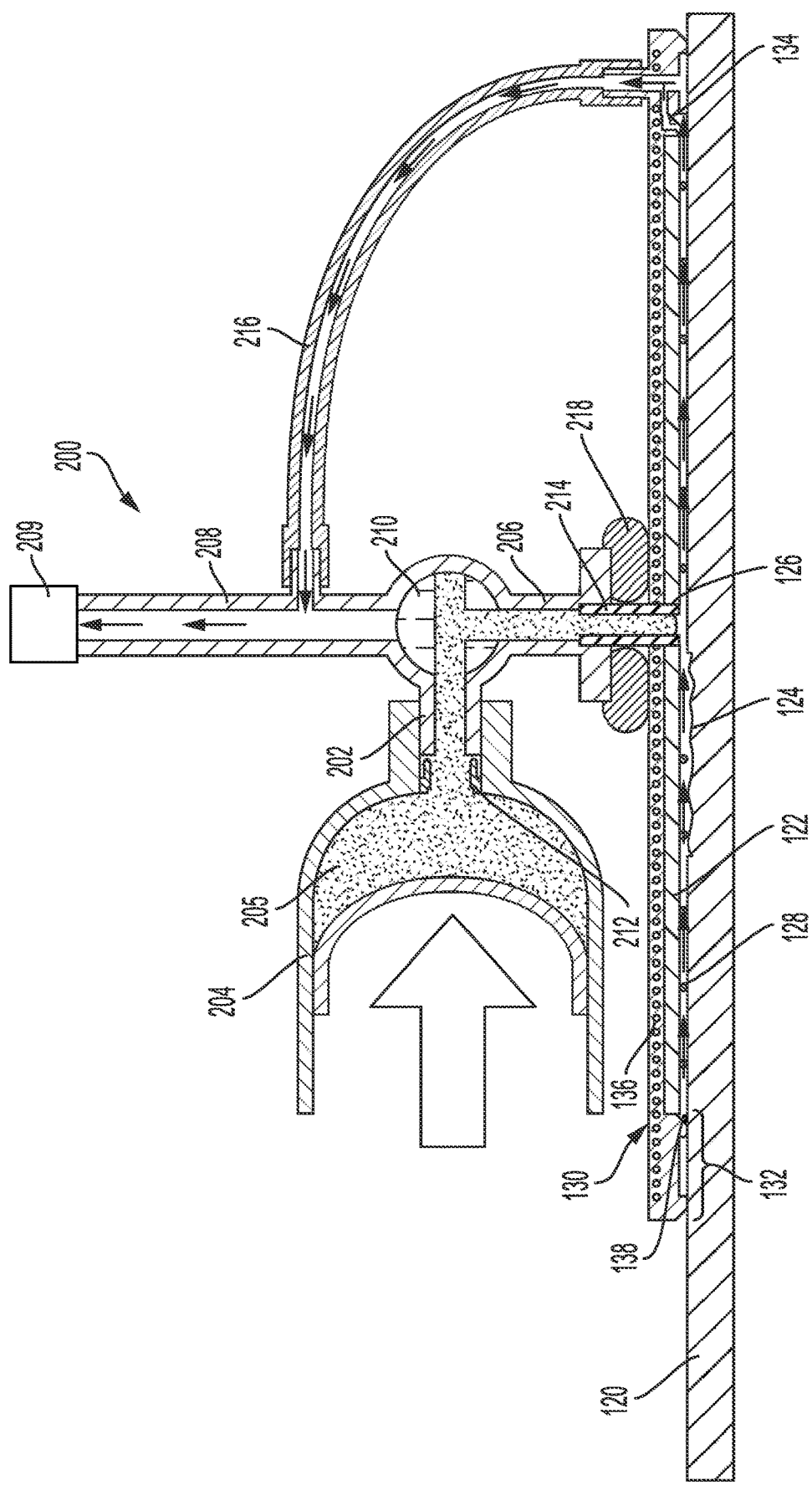
Figure 3H:
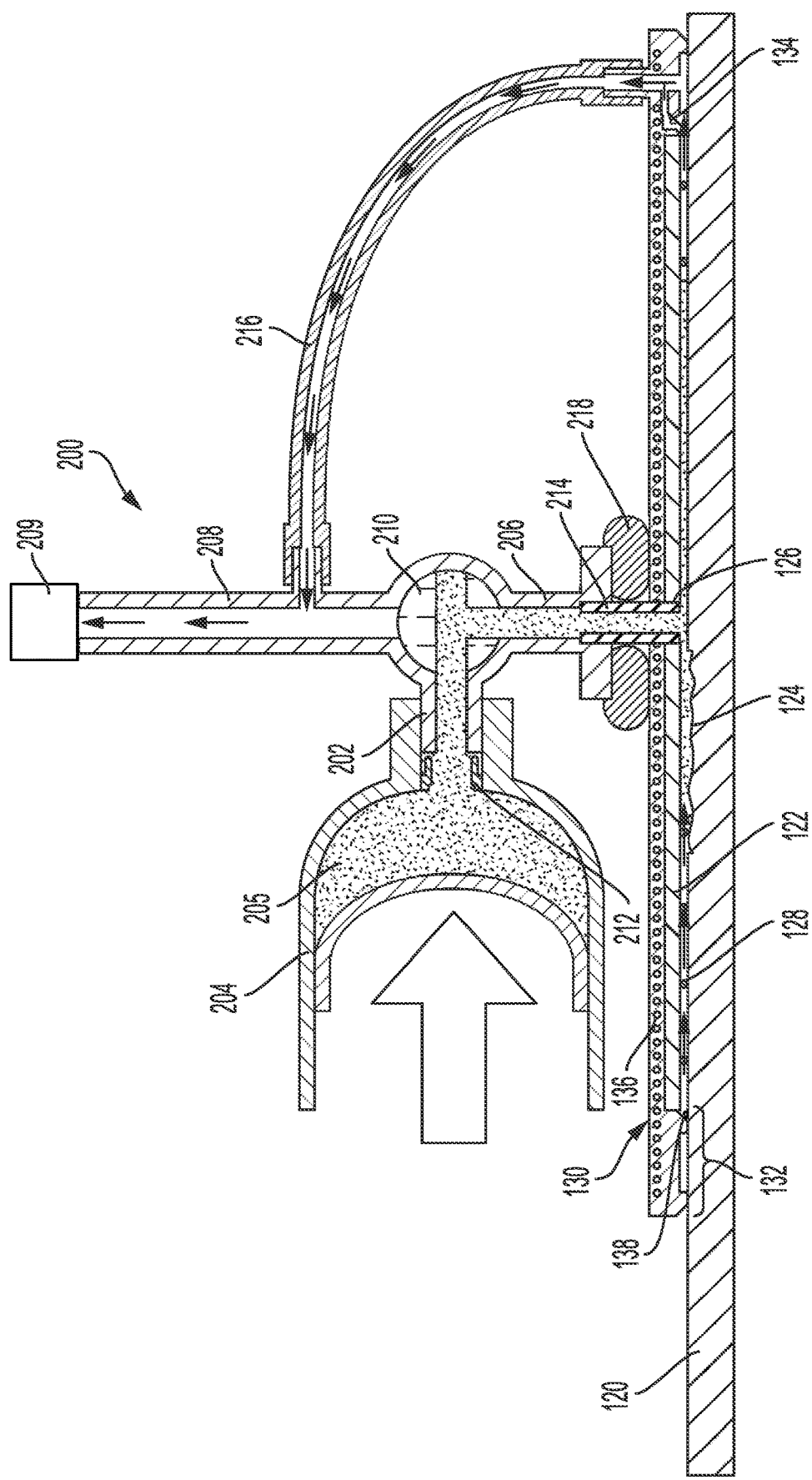
Figure 3I:
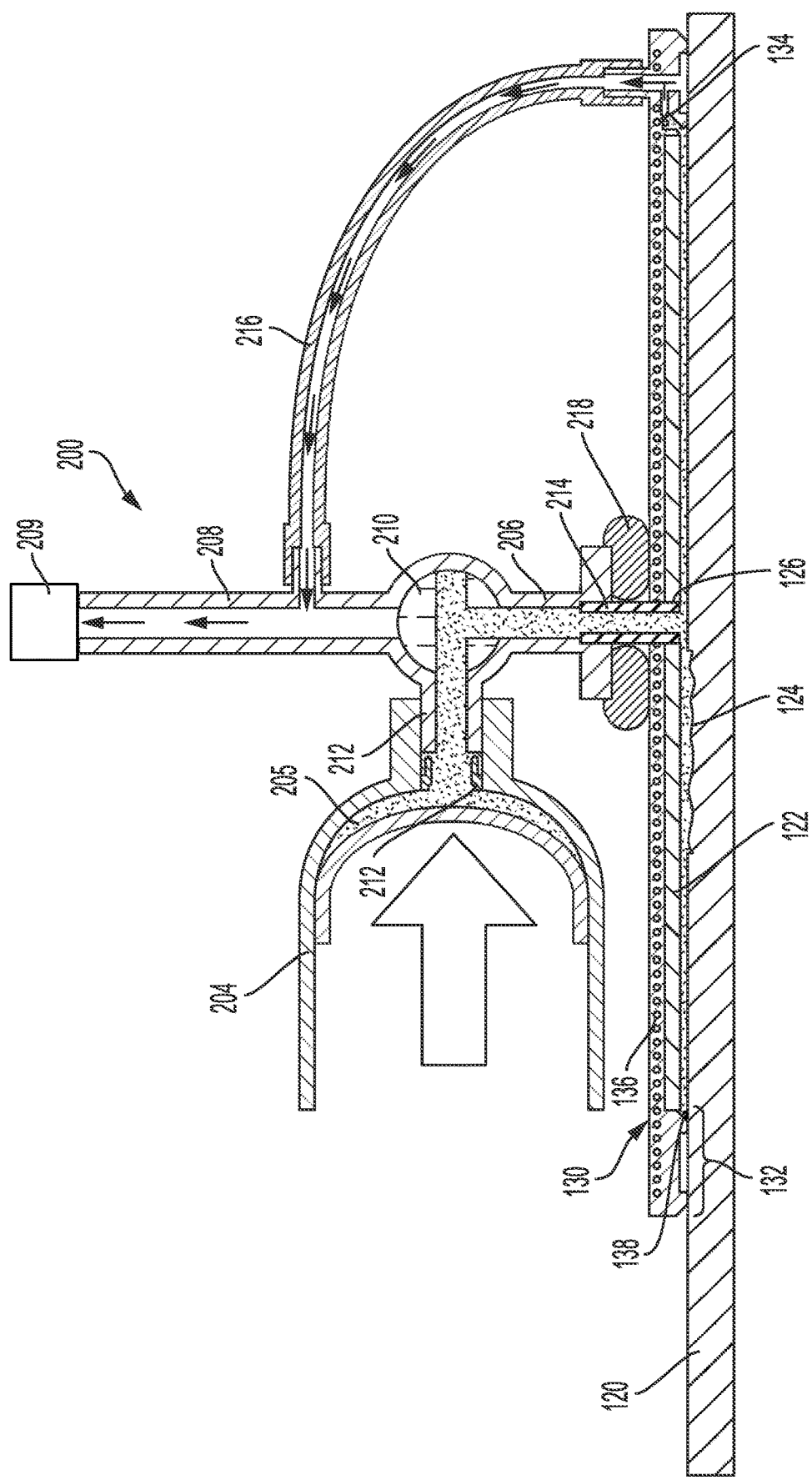

FIG. 3G illustrates a next stage in which the adhesive 205 is forced out of the adhesive reservoir 204, breaking the frangible seal 212, through the evacuated transfer channel 202, then through the evacuated injection channel 206, and then into the evacuated repair area 124. An arrow is shown in FIGS. 3G-3I to illustrate pressure placed on the adhesive reservoir 204, thus forcing the adhesive 205 out of the adhesive reservoir 204. In one example, the pressure is applied manually by a human operator. In another example, the pressure is applied by a robotic device.

FIG. 3H illustrates a next stage in which the adhesive 205 continues to fill the evacuated repair area 124.

FIG. 3I illustrates a next stage in which the adhesive 205 fills the evacuated repair area 124. The adhesive 205 has no air and when injected into the evacuated repair area 124, no voids or trapped air bubbles will be present, since no air was present in the evacuated repair area 124 to resist the adhesive 205 filling the evacuated repair area 124. The resulting bondline is a voidfree bondline, for example. Further, in scenarios where the fill sensor 138 is proximate to the seal ring, the fill sensor 138 can detect that the adhesive 205 has filled the repair area 124 in one or more of the manners described above.

Figure 3J:
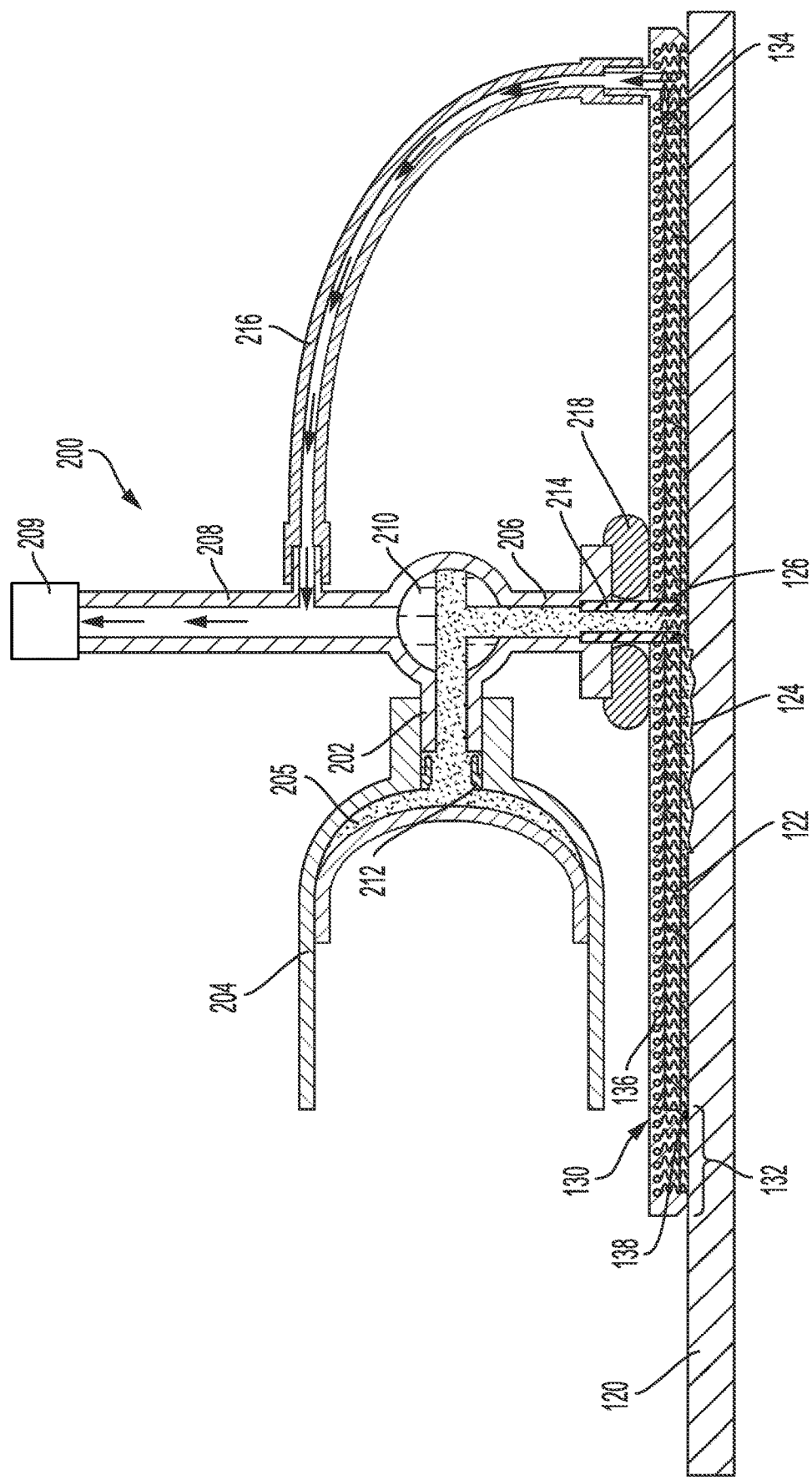

FIG. 3J illustrates a next stage in which the plurality of heating elements 136 are used to at least partially cure the adhesive 205 and repair the repair area 124. Wavy lines are shown to illustrate the heat from the plurality of heating elements 136. Although arrows are shown to represent air continuing to be drawn through the seal actuation tube 216, the continued draw of air during this stage is optional.

In one example, the act of curing the adhesive 205 is performed while the adhesive injection apparatus 200 is still attached to the repair-patch hole 126. In another example, the act of curing the adhesive 205 is performed after the adhesive injection apparatus 200 is detached from the repair-patch hole 126. To facilitate curing of the adhesive 205, the adhesive 205 is conductively heated using the plurality of heating elements 136, which, as noted above, can take the form of portions of a resistance heat blanket. Additionally or alternatively, one or more other forms of heating can be used to cure the adhesive 205 including, but not limited to, radiantly heating the adhesive 205 with a heat lamp (not shown), convectively heating the adhesive 205 with forced air (not shown), and/or inductively heating the adhesive 205 with metallic elements (not shown) embedded in the structure 120. Alternatively, the adhesive 205 may be an adhesive that cures at room temperature, and thus another technique for heating/curing might not be needed. The act of curing the adhesive 205 is optional in some examples as well.

Figure 3K:
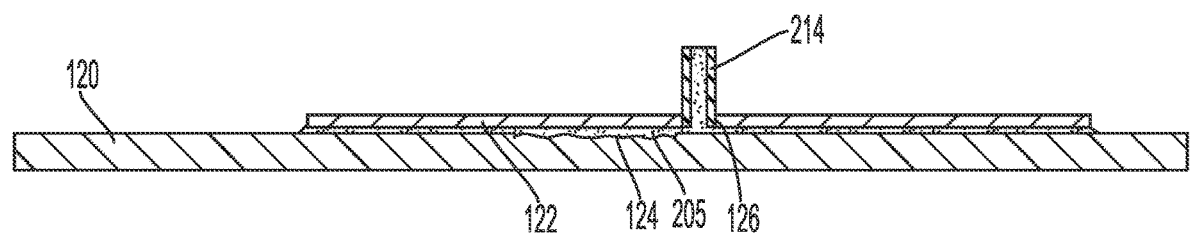

FIG. 3K illustrates a next stage in which the adhesive injection apparatus 200 has been removed or disassembled, leaving only the injection tip 214.

Figure 3L:
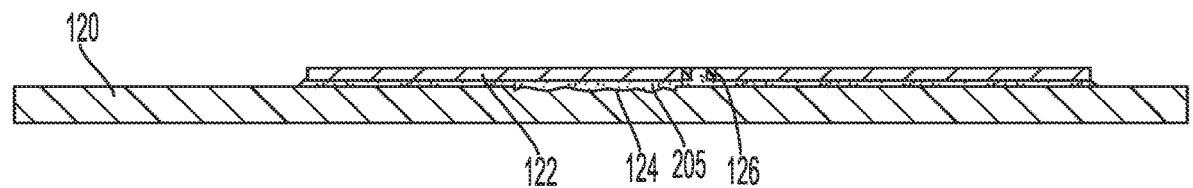

FIG. 3L illustrates a next stage in which the injection tip 214 is trimmed, such as by cutting the injection tip 214 with a blade.

FIGS. 4A-4M illustrate cross-sectional views of example stages of another example process for adhesive-injected patch repair of the structure 120 with a repair patch 122, according to an example implementation. In particular, FIGS. 4A-4M illustrate cross-sectional views of structure 120, repair patch 122, breather and release plies 220, vacuum bag 130, and/or adhesive injection apparatus 200 during various stages of the process for adhesive-injected patch repair of structure 120. In the example of FIGS. 4A-4M, the repair patch 122 takes the form of a multi-layer patch having multiple layers 144 separated by the plurality of bondline spacers 128 (e.g., micro-balloons) (shown as circular objects in FIGS. 4A-4M, as a representative example). Additionally, some of the plurality of bondline spacers 128 are between a bottommost layer of the repair patch 122 and the repair area 124, which are configured to maintain a desired gap between the repair patch 122 and the structure 120. An example thickness of the plurality of bondline spacers 128 between the multiple layers 144 and between the repair patch 122 and the repair area 124 is 0.01 inches. Another example thickness is 0.025 inches. In practice, the layers of the multi-layer patch can include one or more layers of a sheet metal (e.g., titanium), one or more polymer layers, and/or one or more layers of a pre-cured composite. The multi-layer patch shown in FIGS. 4A-4M might be used instead of the pre-cured composite patch shown in FIGS. 3A-3L, for example, in situations where the contour of the repair area 124 is complex (e.g., when there is extensive damage to the structure 120, such as a deep dent or other cavity of damage).

Figure 4A:
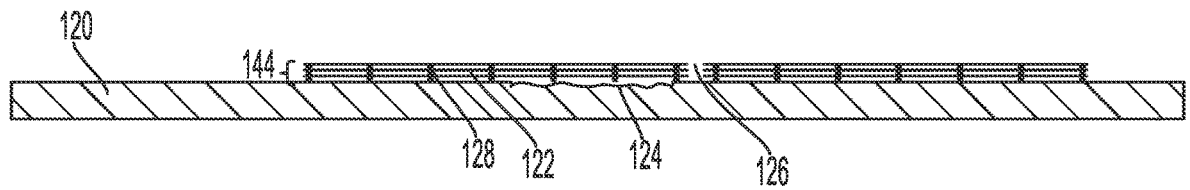

FIG. 4A illustrates an initial stage in the process in which the repair patch 122 is placed over the repair area 124 of the structure 120. The repair patch 122 has a repair-patch hole 126—namely, the hole in each of the multiple layers 144. The repair patch 122 is placed over some of the plurality of bondline spacers 128, such that some of the plurality of bondline spacers 128 are between a bottommost layer of the repair patch 122 and the repair area 124.

Figure 4B:
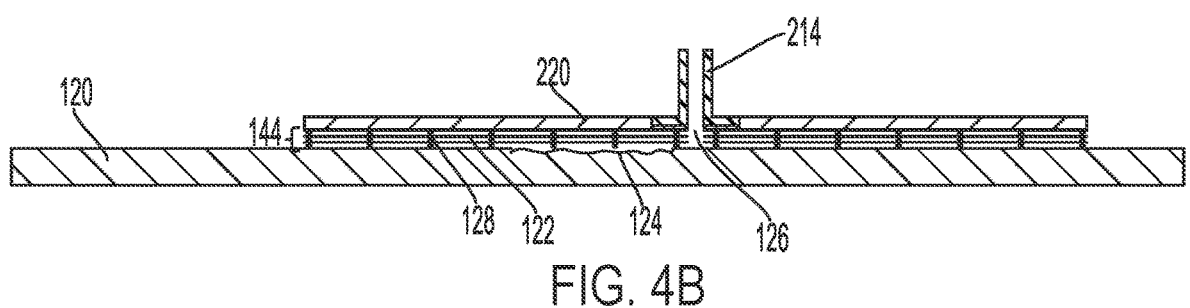

FIG. 4B illustrates a next stage in which the injection tip 214 is placed over the repair-patch hole 126, and breather and release plies 220 are placed over the repair patch 122. The breather and release plies 220 can help air be drawn uniformly across the repair patch 122 to promote even compaction. The breather and release plies 220 can also help keep the adhesive 205 from bonding to the vacuum bag 130 (which, in turn, makes clean-up after completing the repair more efficient and less complex). Although no breather and release plies are shown in the process illustrated by FIGS. 3A-3L, the breather and release plies 220 could optionally be used in that process as well.

Figure 4C:
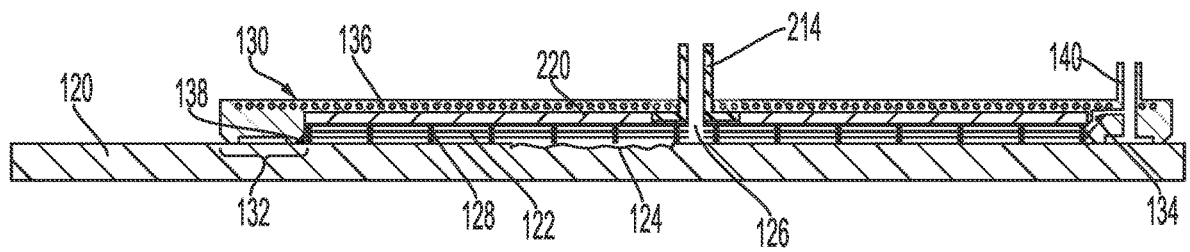

FIG. 4C illustrates a next stage in which the repair patch 122 and the repair area 124 are sealed with the vacuum bag 130 having the seal ring 132 around the periphery of the vacuum bag 130. The vacuum bag 130 also has the float valve 134. In addition, the plurality of heating elements 136 (shown as circular objects in FIGS. 4C-4K, as a representative example) are embedded in the vacuum bag 130. The plurality of heating elements 136 can take various forms, such as those described above. Optionally, a fill sensor 138 can be disposed proximate to the seal ring 132 and can take one of the forms described above.

Figure 4D:
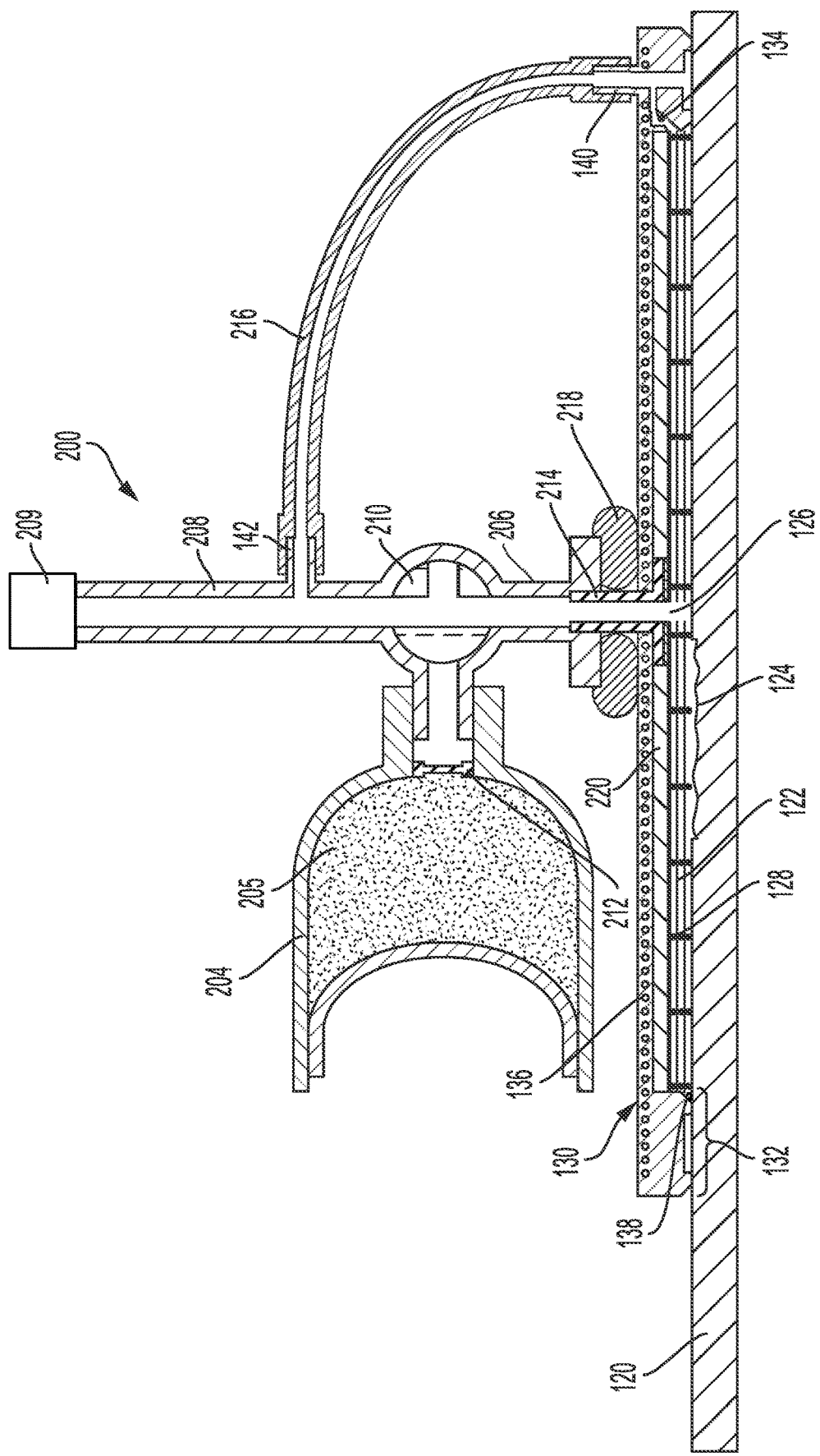

FIG. 4D illustrates a next stage in which the adhesive injection apparatus 200 is attached to the repair-patch hole 126 via the injection tip 214. In some examples, the injection tip 214 can be integrated with the adhesive injection apparatus 200, and in other examples the injection tip 214 can physically separate or detachable from the adhesive injection apparatus 200. As discussed above, the adhesive 205 in the adhesive reservoir 204 can be de-aerated adhesive. As further shown in FIG. 4D, the vacuum seal tape 218 is used to seal the adhesive injection apparatus 200 against the vacuum bag 130.

Figure 4E:
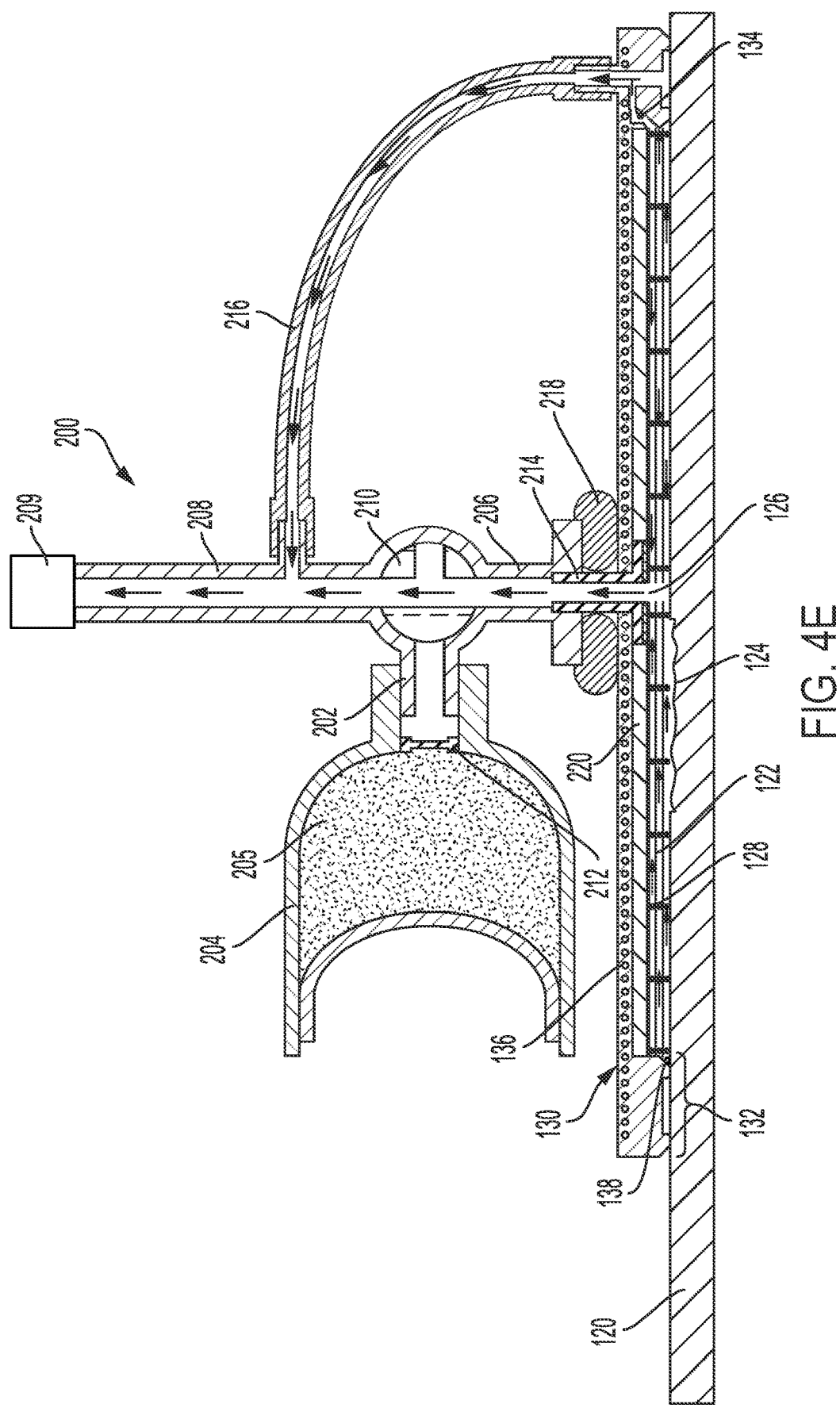

FIG. 4E illustrates a next stage in which the adhesive injection apparatus 200 is used to evacuate the repair area 124 and the injection channel 206 of the adhesive injection apparatus 200. To facilitate this, the three-way valve 210 can be positioned as shown in FIG. 4E to establish fluid communication between the evacuation channel 208 and the injection channel 206, thus allowing for the vacuum source 209 to be turned on and used to evacuate the injection channel 206 and the repair area 124. Air is thus evacuated through the injection channel 206 and the seal actuation tube 216. Arrows are shown to illustrate the air drawn out of the injection channel 206 and the repair area 124, including between the layers of the repair patch 122. Further, by drawing a vacuum through the seal actuation tube 216, the seal ring 132 engages with the structure 120.

Figure 4F:
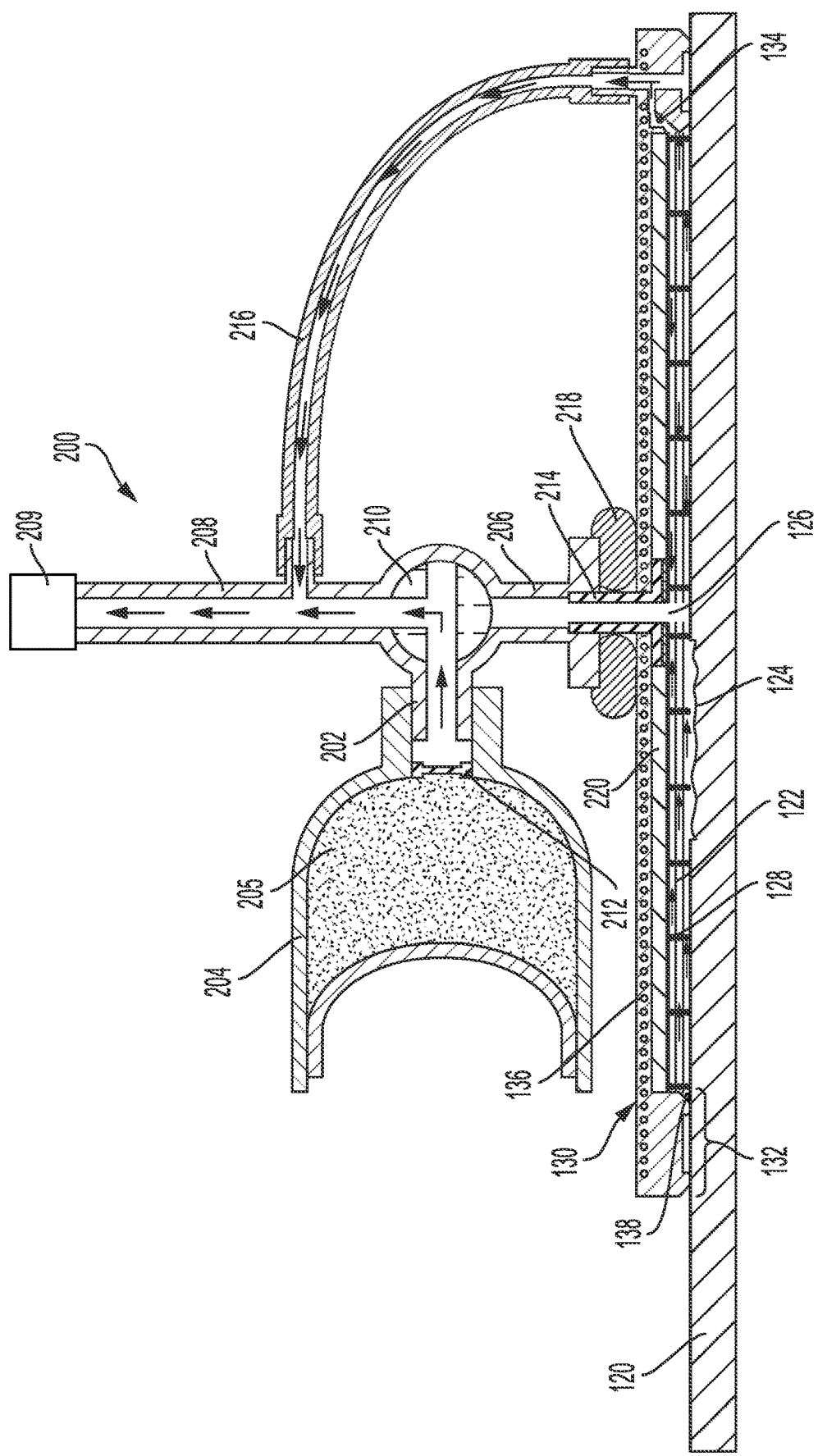

FIG. 4F illustrates a next stage in which the adhesive injection apparatus 200 is used to evacuate the transfer channel 202. To facilitate this, the three-way valve 210 can be positioned as shown in FIG. 4F to establish fluid communication between the evacuation channel 208 and the transfer channel 202. In some examples, this can be done before or after the stage illustrated in FIG. 4E. Alternatively, the three-way valve 210 can be positioned (i.e., rotated approximately 90 degrees counterclockwise from the position shown in FIG. 4F) to establish fluid communication between the evacuation channel 208, the injection channel 206, and the transfer channel 202, thus allowing for the vacuum source 209 to be turned on and used to evacuate the injection channel 206, the transfer channel 202, and the repair area 124 at substantially the same time. As further shown, air can continue to be evacuated out of the repair area 124 via the seal actuation tube 216 at substantially the same time as the transfer channel 202 is being evacuated.

Figure 4G:
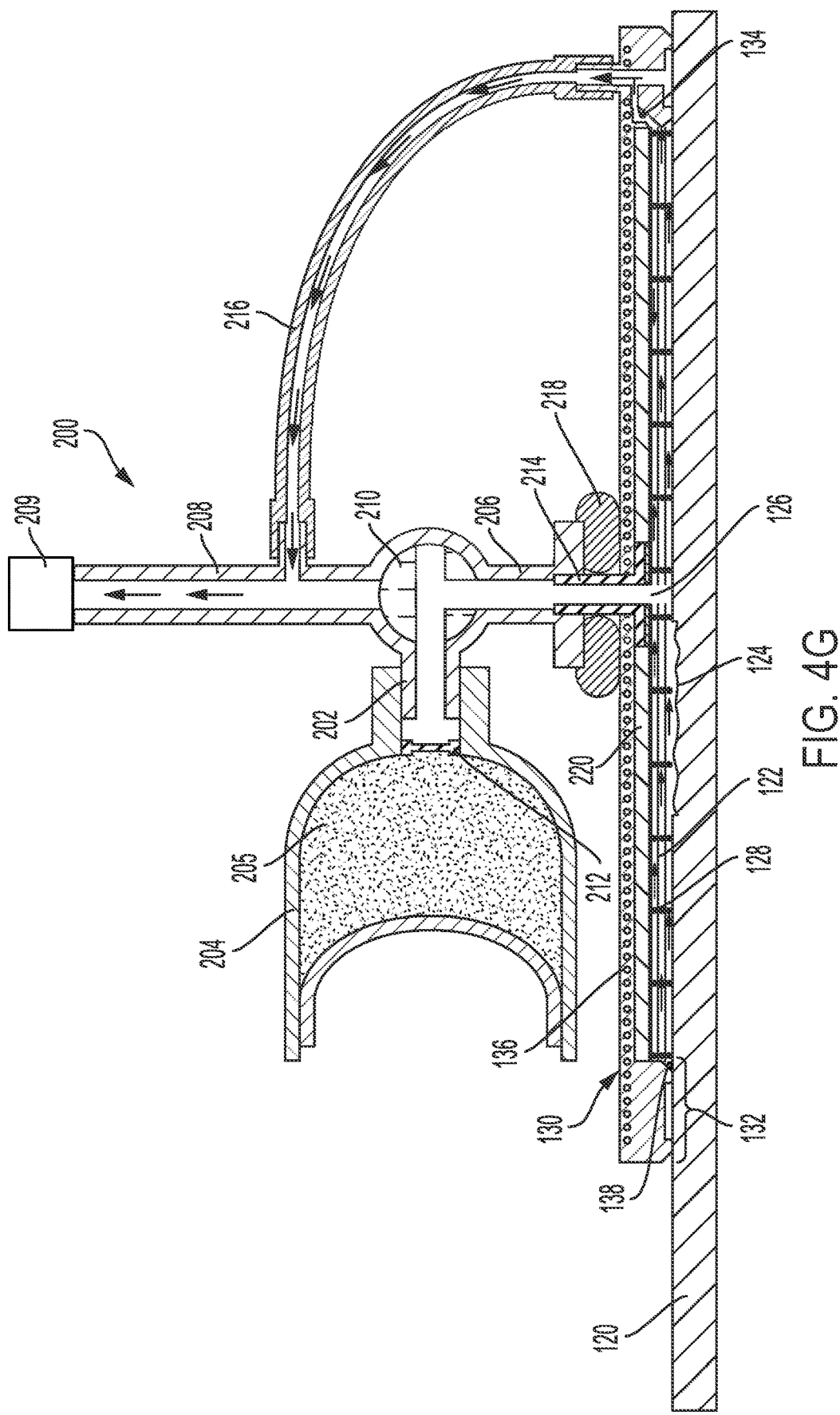

FIG. 4G illustrates a next stage in which the adhesive injection apparatus 200 is prepared for injection of the adhesive 205 into the repair area 124. To facilitate this, the three-way valve 210 can be positioned as shown in FIG. 4G to establish fluid communication between the evacuated transfer channel 202 and the evacuated injection channel 206. Optionally, the vacuum source 209 can be used to continue to draw air out of the repair area 124 during this stage and/or during one or more other stages in which the adhesive 205 is being injected into the repair area 124, such as the stages shown in FIGS. 4H-4J. In this stage and such other stages, arrows are shown to illustrate the air drawn out of the repair area 124 via the seal actuation tube 216.

FIG. 4H illustrates a next stage in which the adhesive 205 is forced out of the adhesive reservoir 204, breaking the frangible seal 212, through the evacuated transfer channel 202, then through the evacuated injection channel 206, and then into the evacuated repair area 124, including into the repair patch 122—that is, into the evacuated space between the multiple layers 144 of the repair patch 122. An arrow is shown in FIGS. 4H-4J to illustrate pressure placed on the adhesive reservoir 204, thus forcing the adhesive 205 out of the adhesive reservoir 204.

Figure 4I:
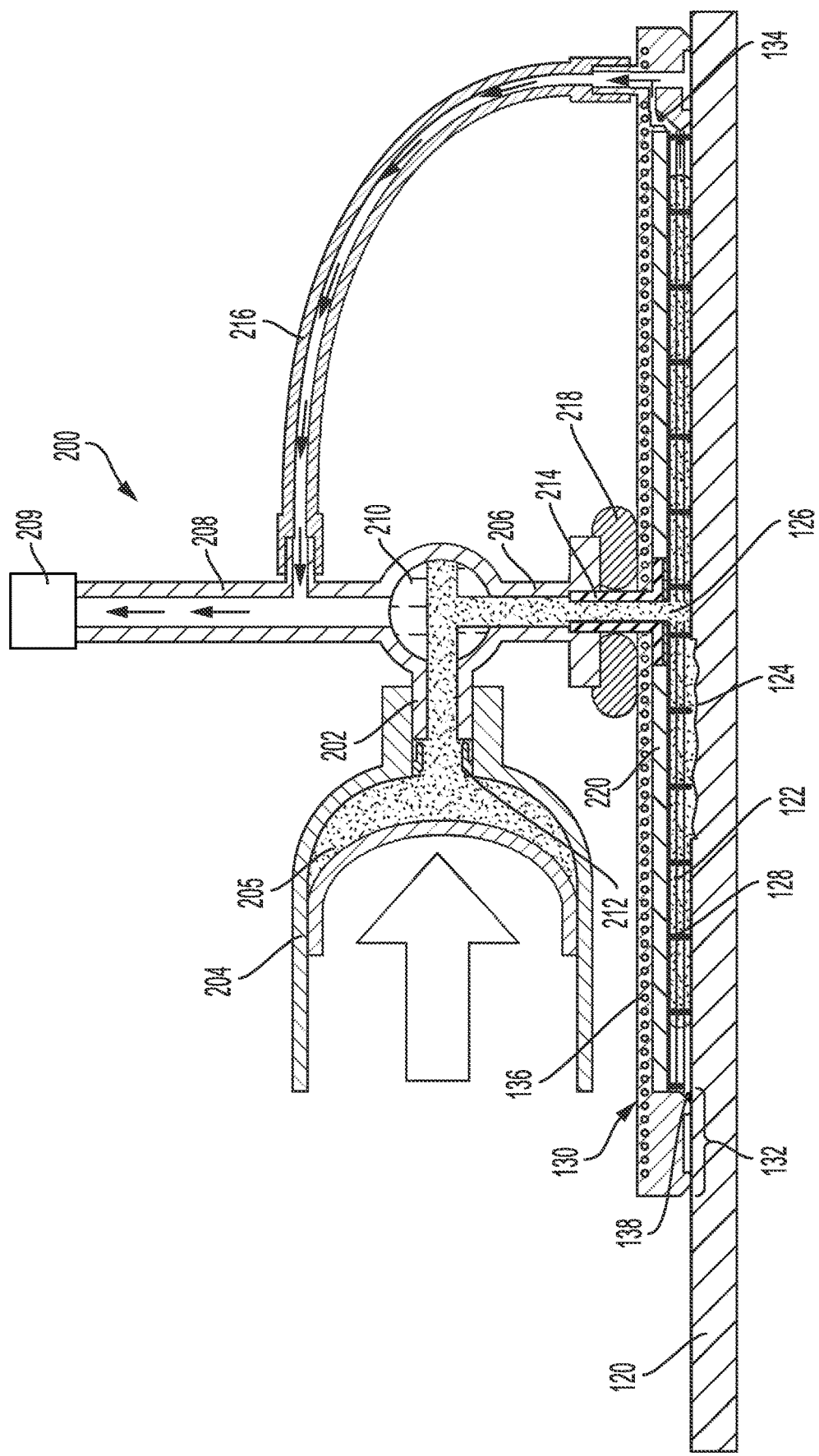

FIG. 4I illustrates a next stage in which the adhesive 205 continues to fill the evacuated repair area 124.

Figure 4J:
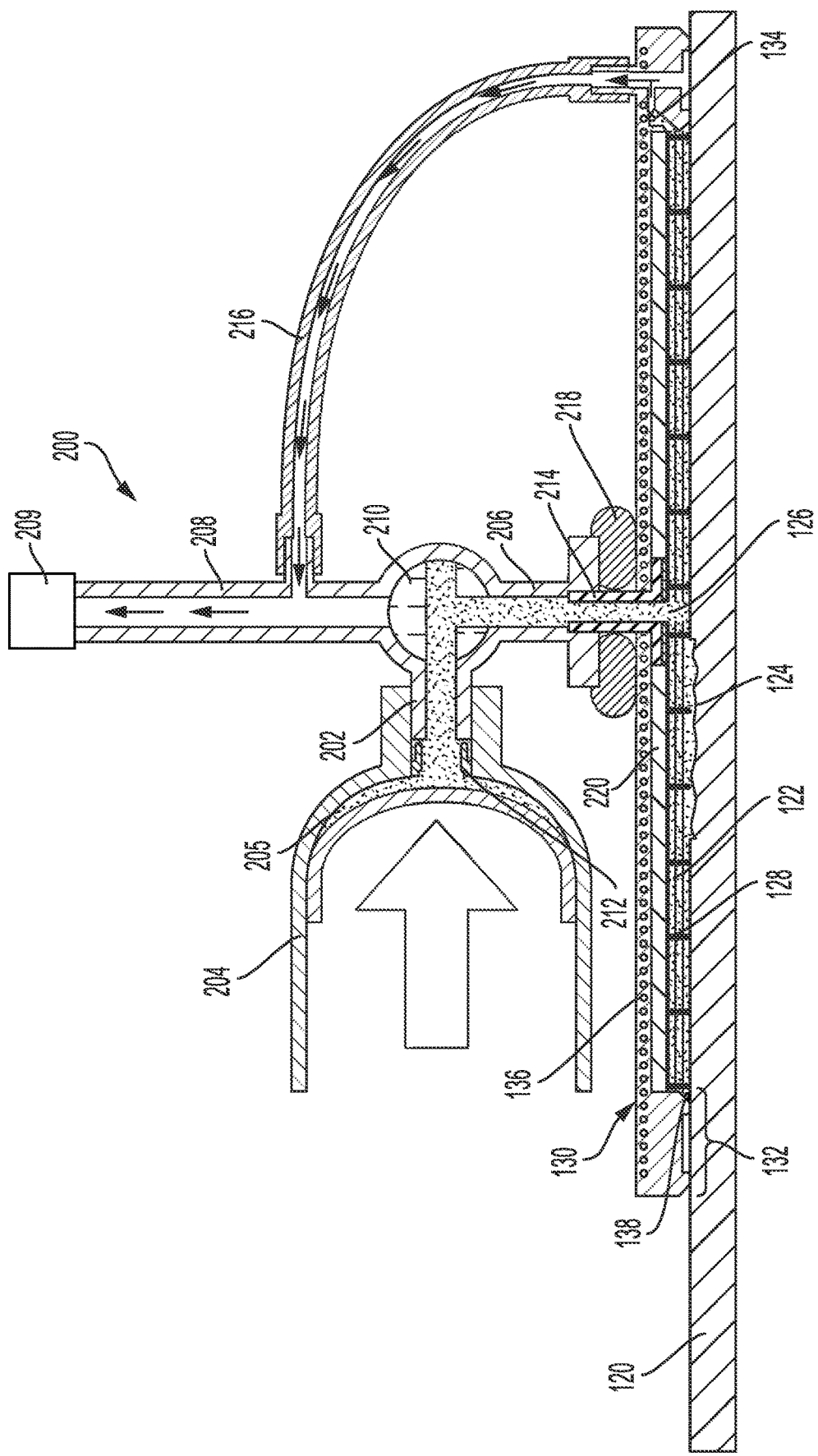

FIG. 4J illustrates a next stage in which the adhesive 205 fills the evacuated repair area 124. The adhesive 205 has no air and when injected into the evacuated repair area 124, no voids or trapped air bubbles will be present, since no air was present in the evacuated repair area 124 to resist the adhesive 205 filling the evacuated repair area 124. The resulting bondline is a voidfree bondline, for example. Further, in scenarios where the fill sensor 138 is proximate to the seal ring, the fill sensor 138 can detect that the adhesive 205 has filled the repair area 124 in one or more of the manners described above. Although arrows are shown to represent air continuing to be drawn through the seal actuation tube 216, the continued draw of air during this stage is optional.

Figure 4K:
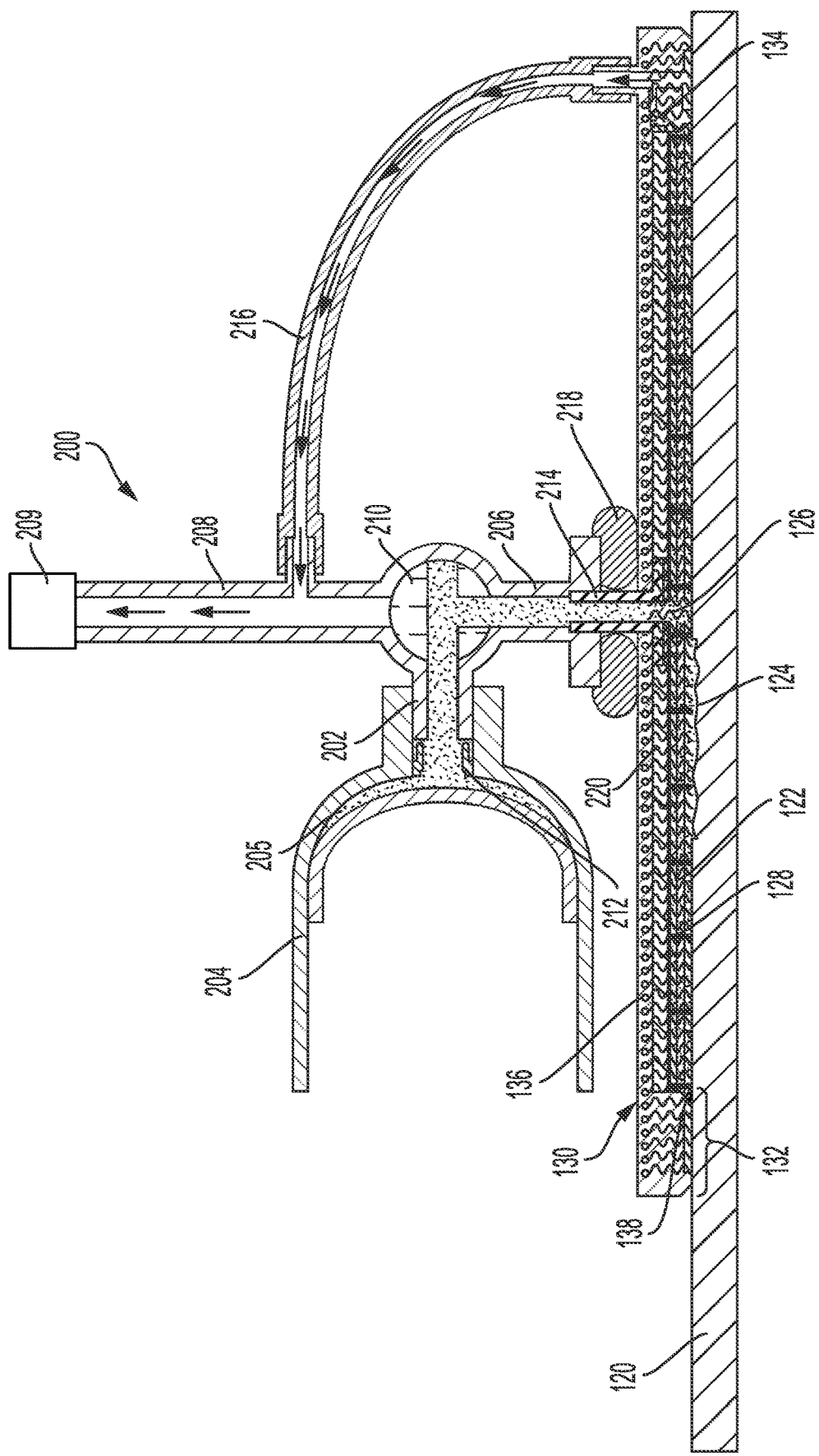

FIG. 4K illustrates a next stage in which the plurality of heating elements 136 are used to at least partially cure the adhesive 205 and repair the repair area 124. Wavy lines are shown to illustrate the heat from the plurality of heating elements 136. Heating and curing the adhesive 205 can be performed in various ways, such as one or more of the ways described above. The act of curing the adhesive 205 is optional in some examples as well.

Figure 4L:
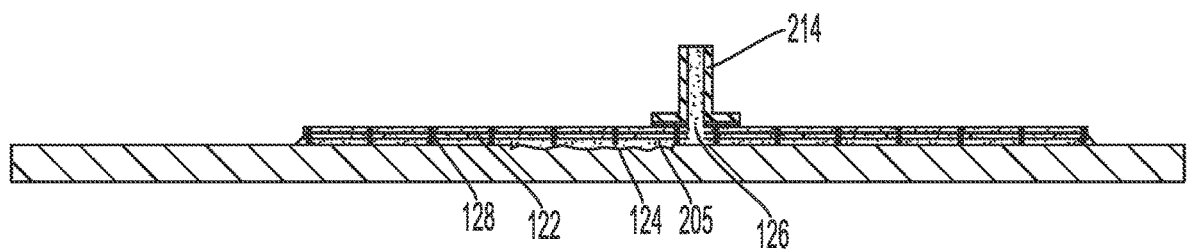

FIG. 4L illustrates a next stage in which the adhesive injection apparatus 200 has been removed or disassembled and the breather and release plies 220 are removed, leaving only the injection tip 214.

Figure 4M:
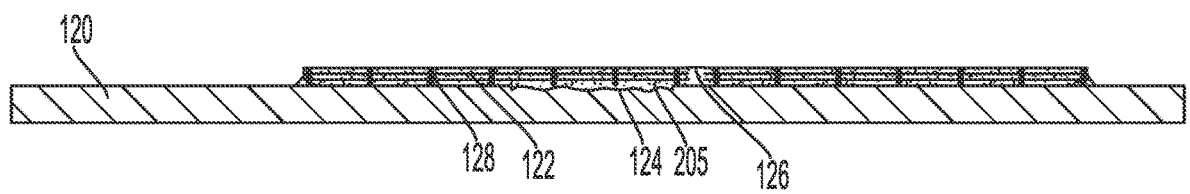

FIG. 4M illustrates a next stage in which the injection tip 214 is removed, such as by trimming the injection tip 214 off of the repair patch 122 with a blade.

It should be understood that, although two example types of patches are described above with respect to FIGS. 3A-3L and FIGS. 4A-4M, other types of patches can be used in alternative examples. Furthermore, other types of adhesive injection apparatuses could be used in alternative examples.

Figure 5:
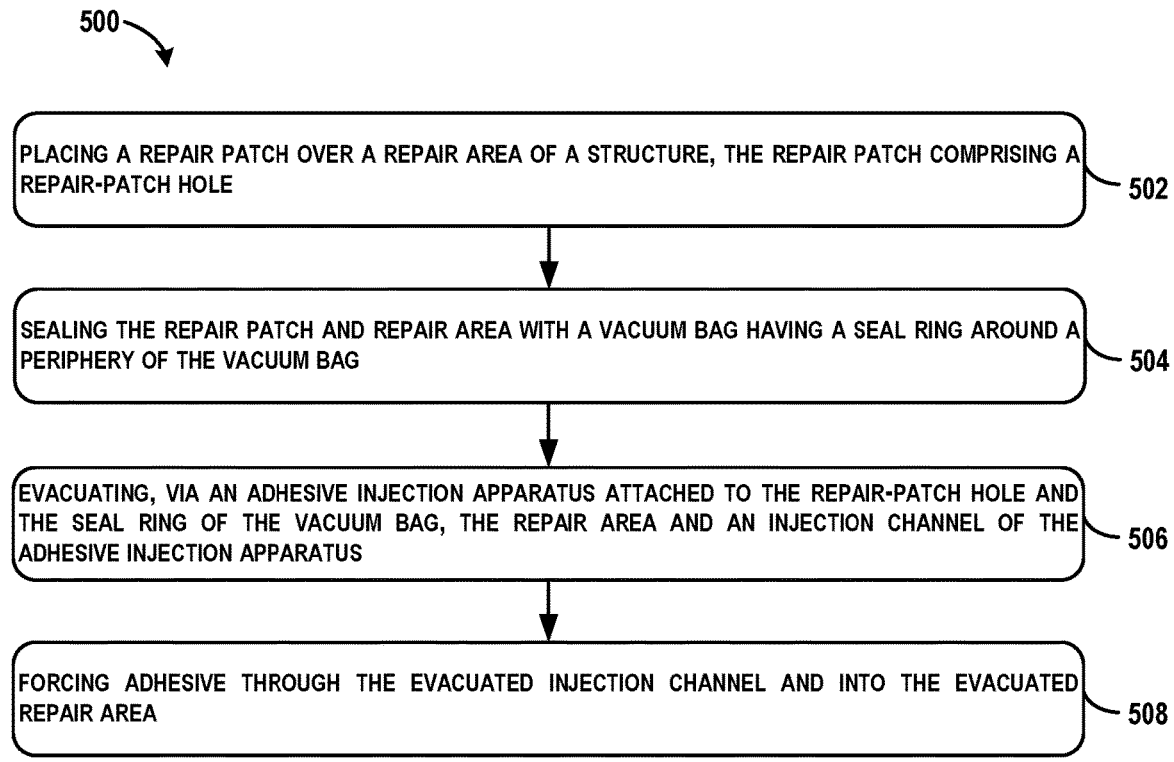
FIG. 5 shows a flowchart of an example method for adhesive-injected patch repair, according to an example implementation.

FIG. 5 shows a flowchart of an example of a method 500 for adhesive-injection patch repair. Method 500 shown in FIG. 5 presents an example of a method that could be used with the system 100 shown in FIGS. 1-2, or with components thereof. Further, the functions described with respect to FIG. 5 may be supplemented by, replaced by, or combined with functions and phases described above with respect to FIGS. 3A-3L and FIGS. 4A-4M, for example. Further, devices or systems may be used or configured to perform logical functions presented in FIG. 5.

In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 500 includes one or more operations, functions, or actions as illustrated by one or more of blocks 502-508. Further, blocks of FIGS. 6-18 may be performed in accordance with one or more of block 502-508. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Within examples, one or more blocks of the method 500 may be represented in program code or circuitry used for controlling robotic mechanisms for adhesive-injected patch repair of a structure. While method 500 and variations thereof may be executed automatically using, for example, one or more robotic armatures controlled by program code operating in accordance with the method 500, some tasks may be performed manually. Thus, within examples, certain functionality described with respect to the method 500 may be performed automatically while other portions can be performed manually. Alternatively, all blocks of the method 500 may be performed automatically or all blocks of the method 500 may be performed manually.

At block 502, the method 500 includes placing a repair patch 122 over a repair area 124 of a structure 120, the repair patch 122 comprising a repair-patch hole 126.

At block 504, the method 500 includes sealing the repair patch 122 and repair area 124 with a vacuum bag 130 having a seal ring 132 around a periphery of the vacuum bag 130.

At block 506, the method 500 includes evacuating, via an adhesive injection apparatus 200 attached to the repair-patch hole 126 and the seal ring 132 of the vacuum bag 130, the repair area 124 and an injection channel 206 of the adhesive injection apparatus 200.

At block 508, the method 500 includes forcing adhesive 205 through the evacuated injection channel 206 and into the evacuated repair area 124.

Figure 6:
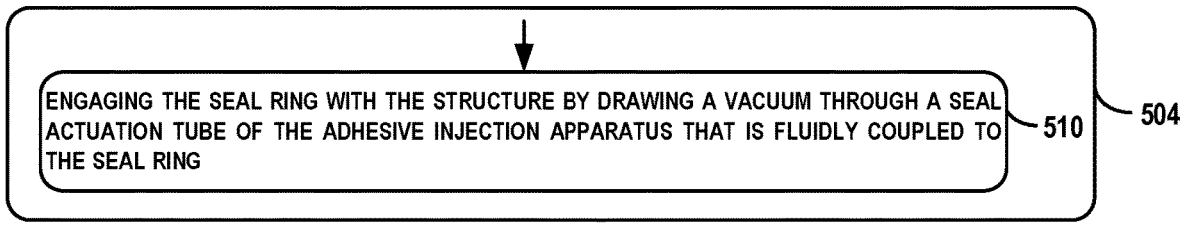
FIG. 6 shows a flowchart of an example method for performing the sealing function of the method of FIG. 5, according to an example implementation.

FIG. 6 shows a flowchart of an example method for performing the sealing as shown in block 504. At block 510, functions include engaging the seal ring 132 with the structure 120 by drawing a vacuum through a seal actuation tube 216 of the adhesive injection apparatus 200 that is fluidly coupled to the seal ring 132.

Figure 7:
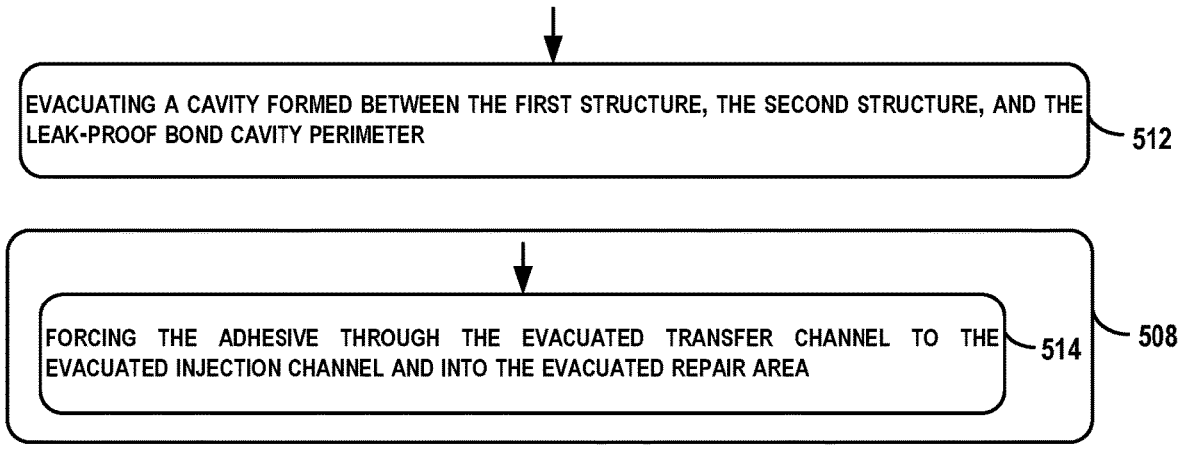
FIG. 7 shows a flowchart of an example method for use with the method of FIG. 5, as well as an example method for performing the forcing function of the method of FIG. 5, according to an example implementation.

FIG. 7 shows a flowchart of an example method for use with the method 500. At block 512, functions include evacuating a transfer channel 202 fluidly coupled to an adhesive reservoir 204 of the adhesive injection apparatus 200. FIG. 7 also shows a flowchart of an example method for performing the forcing as shown in block 508. At block 514, functions include forcing the adhesive 205 through the evacuated transfer channel 202 to the evacuated injection channel 206 and into the evacuated repair area 124.

Figure 8:
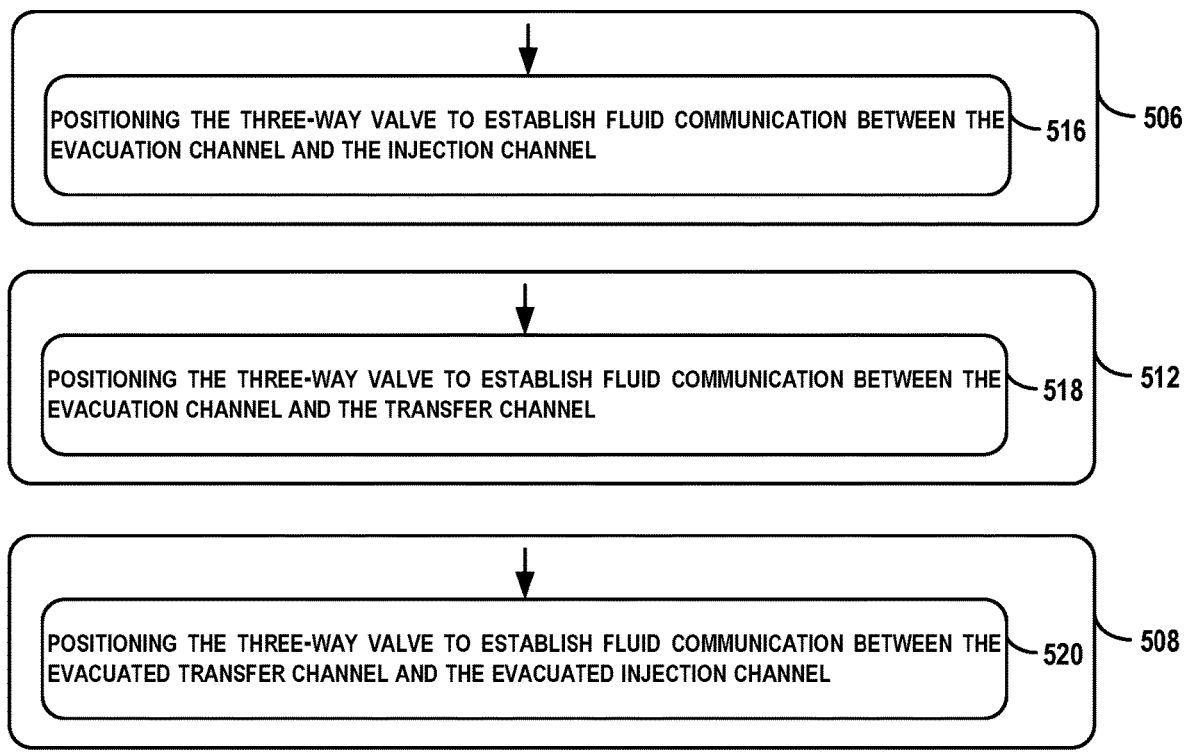
FIG. 8 shows a flowchart of an example method for performing the evacuating and forcing functions of the method of FIG. 5, as well as an example method for performing the evacuating function of the method of FIG. 7, according to an example implementation.

FIG. 8 shows a flowchart of an example method for performing the evacuating as shown in block 506, the evacuating as shown in block 512, and the forcing as shown in block 508, particularly where the adhesive injection apparatus 200 comprises (i) a three-way valve 210 fluidly coupled to the transfer channel 202, the injection channel 206 that is coupled to the repair area 124, and an evacuation channel 208 that is coupled to a vacuum source 209 and (ii) a seal actuation tube 216 fluidly coupled to the seal ring 132 and the evacuation channel 208. At block 516, functions include positioning the three-way valve 210 to establish fluid communication between the evacuation channel 208 and the injection channel 206. At block 518, functions include positioning the three-way valve 210 to establish fluid communication between the evacuation channel 208 and the transfer channel 202. At block 520, functions include positioning the three-way valve 210 to establish fluid communication between the evacuated transfer channel 202 and the evacuated injection channel 206.

Figure 9:
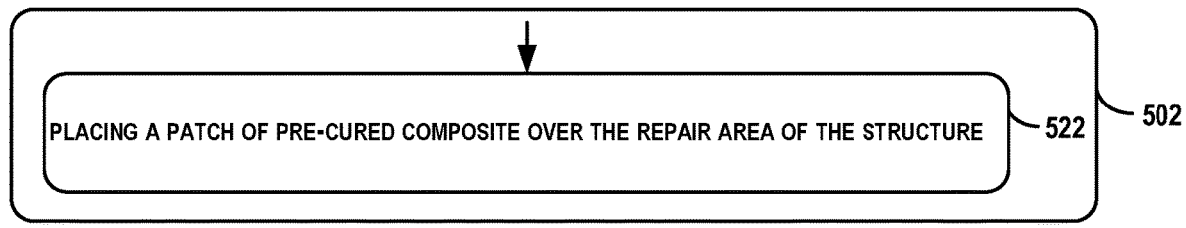
FIG. 9 shows a flowchart of an example method for performing the placing function of the method of FIG. 5, according to an example implementation.

FIG. 9 shows a flowchart of an example method for performing the placing as shown in block 502. At block 522, functions include placing a patch of pre-cured composite over the repair area 124 of the structure 120.

Figure 10:
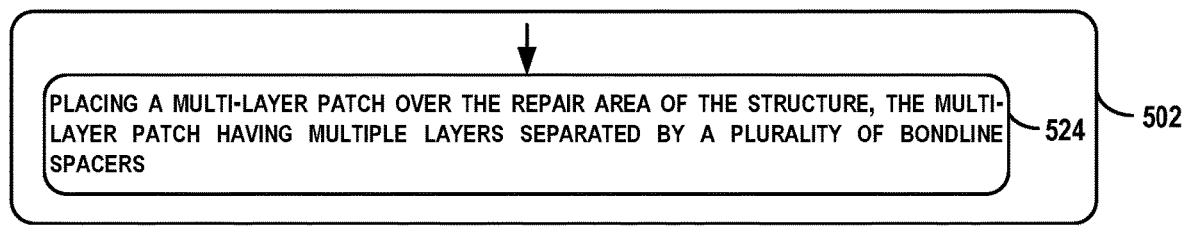
FIG. 10 shows a flowchart of an example method for performing the placing and forcing functions of the method of FIG. 5, according to an example implementation.
Figure 10:
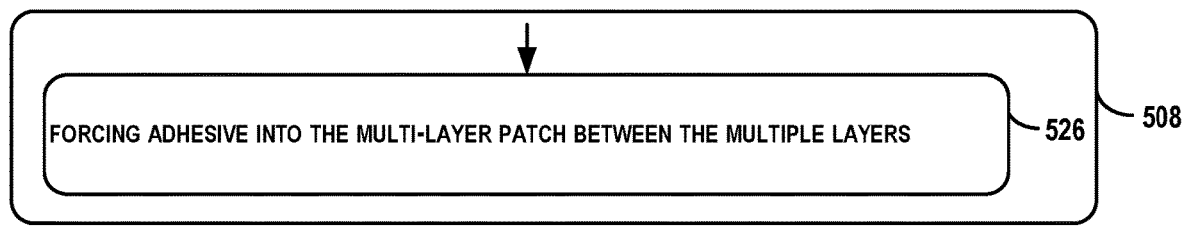

FIG. 10 shows a flowchart of an example method for performing the placing as shown in block 502 and the forcing as shown in block 508. At block 524, functions include placing a multi-layer patch over the repair area 124 of the structure 120, the multi-layer patch having multiple layers 144 separated by a plurality of bondline spacers. At block 526, functions include forcing adhesive 205 into the multi-layer patch between the multiple layers 144. In such embodiments, the multiple layers 144 of the multi-layer patch comprise layers of one or more of a sheet metal, a polymer, or a pre-cured composite.

Figure 11:
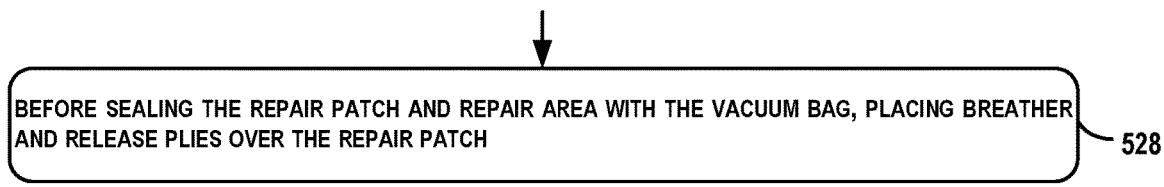
FIG. 11 shows a flowchart of another example method for use with the method of FIG. 10, according to an example implementation.

FIG. 11 shows a flowchart of an example method for use with the method 500, particularly with the functions shown in blocks 524-526. At block 528, functions include before sealing the repair patch 122 and repair area 124 with the vacuum bag 130, placing breather and release plies 220 over the repair patch 122.

Figure 12:
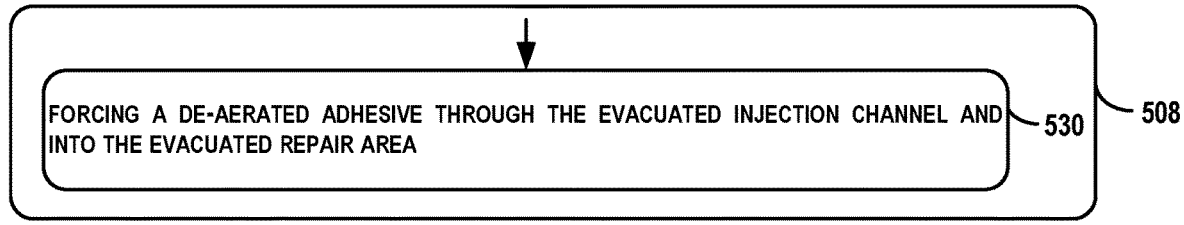
FIG. 12 shows a flowchart of an example method for performing the forcing function of the method of FIG. 5, according to an example implementation.

FIG. 12 shows a flowchart of an example method for performing the forcing as shown in block 508. At block 530, functions include forcing a de-aerated adhesive through the evacuated injection channel 206 and into the evacuated repair area 124.

Figure 13:
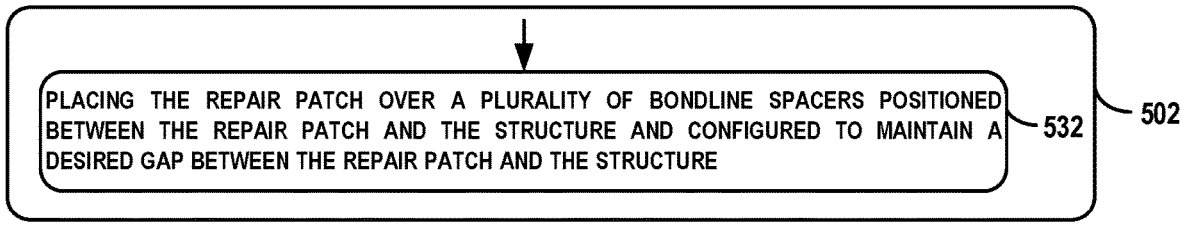
FIG. 13 shows a flowchart of an example method for performing the placing function of the method of FIG. 5, according to an example implementation.

FIG. 13 shows a flowchart of an example method for performing the placing as shown in block 502. At block 532, functions include placing the repair patch 122 over a plurality of bondline spacers 128 positioned between the repair patch 122 and the structure 120 and configured to maintain a desired gap between the repair patch 122 and the structure 120.

Figure 14:
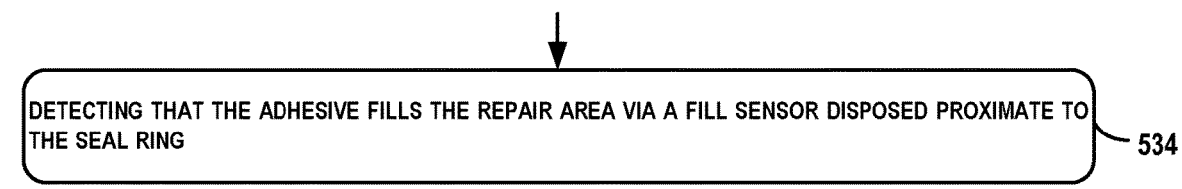
FIG. 14 shows a flowchart of another example method for use with the method of FIG. 5, according to an example implementation.

FIG. 14 shows a flowchart of an example method for use with the method 500. At block 534, functions include detecting that the adhesive 205 fills the repair area 124 via a fill sensor disposed proximate to the seal ring 132.

Figure 15:
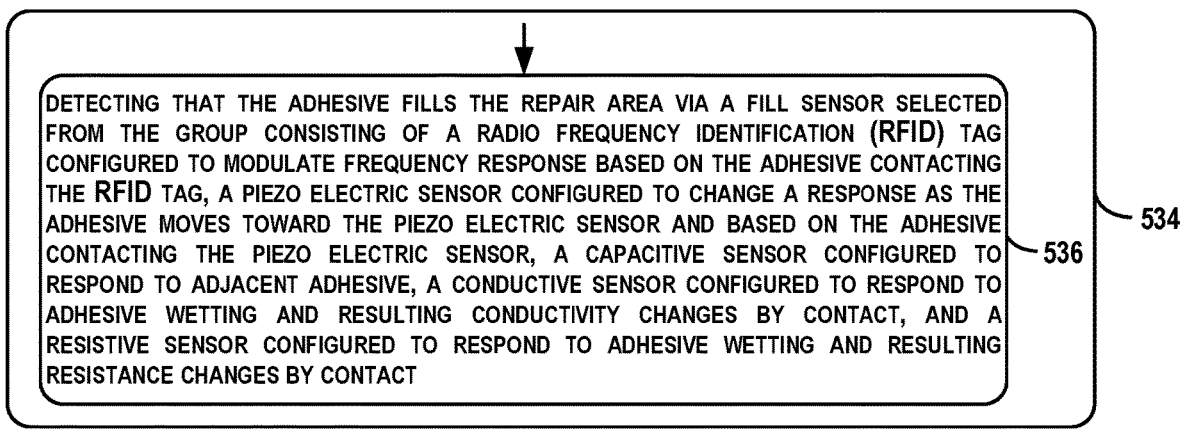
FIG. 15 shows a flowchart of an example method for performing the detecting function of the method of FIG. 14, according to an example implementation.

FIG. 15 shows a flowchart of an example method for performing the detecting as shown in block 534. At block 536, functions include detecting that the adhesive 205 fills the repair area 124 via a fill sensor 138 selected from the group consisting of a radio frequency identification (RFID) tag configured to modulate frequency response based on the adhesive 205 contacting the RFID tag, a piezo electric sensor configured to change a response as the adhesive 205 moves toward the piezo electric sensor and based on the adhesive 205 contacting the piezo electric sensor, a capacitive sensor configured to respond to adjacent adhesive, a conductive sensor configured to respond to adhesive wetting and resulting conductivity changes by contact, and a resistive sensor configured to respond to adhesive wetting and resulting resistance changes by contact.

Figure 16:
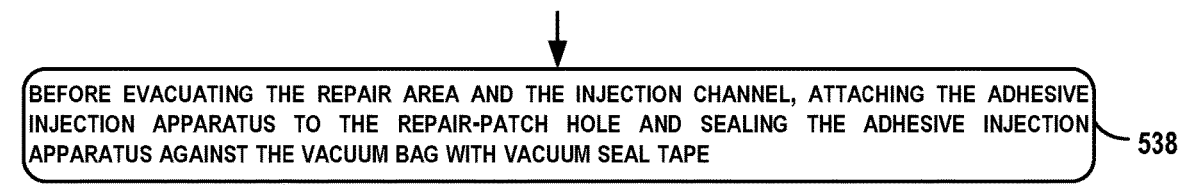
FIG. 16 shows a flowchart of another example method for use with the method of FIG. 5, according to an example implementation.

FIG. 16 shows a flowchart of an example method for use with the method 500. At block 538, functions include before evacuating the repair area 124 and the injection channel 206, attaching the adhesive injection apparatus 200 to the repair-patch hole 126 and sealing the adhesive injection apparatus 200 against the vacuum bag 130 with vacuum seal tape 218.

Figure 17:
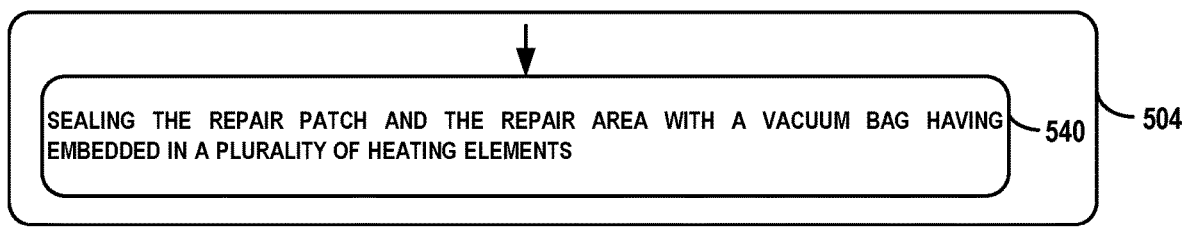
FIG. 17 shows a flowchart of an example method for performing the sealing function of the method of FIG. 5, according to an example implementation.

FIG. 17 shows a flowchart of an example method for performing the sealing as shown in block 504. At block 540, functions include sealing the repair patch 122 and the repair area 124 with a vacuum bag 130 having embedded within a plurality of heating elements 136.

Figure 18:
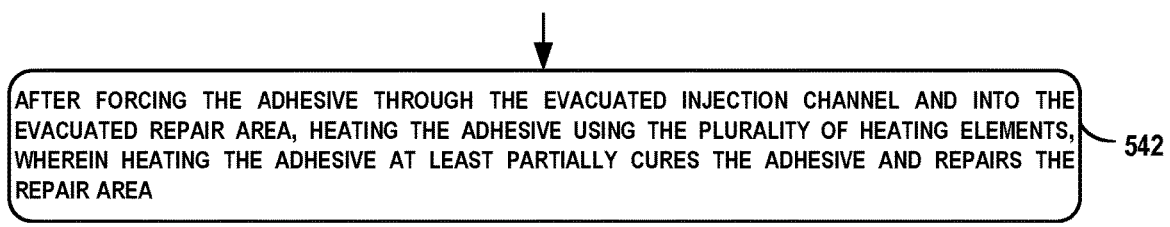
FIG. 18 shows a flowchart of another example method for use with the method of FIG. 5, according to an example implementation.

FIG. 18 shows a flowchart of an example method for use with the method 500. At block 542, functions include after forcing the adhesive 205 through the evacuated injection channel 206 and into the evacuated repair area 124, heating the adhesive 205 using the plurality of heating elements 136, wherein heating the adhesive 205 at least partially cures the adhesive 205 and repairs the repair area 124.

In some embodiments, the vacuum bag 130 of the method 500 comprises a float valve 134 configured to prevent the adhesive 205 from flowing into the seal ring 132.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:
1. A method comprising:
placing a repair patch over a repair area of a structure, the repair patch comprising a repair-patch hole;
sealing the repair patch and repair area with a vacuum bag having a seal ring around a periphery of the vacuum bag;
evacuating, via an adhesive injection apparatus attached to the repair-patch hole and the seal ring of the vacuum bag, the repair area and an injection channel of the adhesive injection apparatus; and forcing adhesive through the evacuated injection channel and into the evacuated repair area.

2. The method of claim 1, wherein sealing the repair patch and repair area with the vacuum bag comprises engaging the seal ring with the structure by drawing a vacuum through a seal actuation tube of the adhesive injection apparatus that is fluidly coupled to the seal ring.

3. The method of claim 1, further comprising:
evacuating a transfer channel fluidly coupled to an adhesive reservoir of the adhesive injection apparatus,
wherein forcing the adhesive through the evacuated injection channel and into the evacuated repair area comprises forcing the adhesive through the evacuated transfer channel to the evacuated injection channel and into the evacuated repair area.

4. The method of claim 3, wherein:
the adhesive injection apparatus comprises (i) a three-way valve fluidly coupled to the transfer channel, the injection channel that is coupled to the repair area, and an evacuation channel that is coupled to a vacuum source and (ii) a seal actuation tube fluidly coupled to the seal ring and the evacuation channel,
evacuating the repair area comprises positioning the three-way valve to establish fluid communication between the evacuation channel and the injection channel,
evacuating the transfer channel comprises positioning the three-way valve to establish fluid communication between the evacuation channel and the transfer channel, and
forcing the adhesive through the evacuated transfer channel to the evacuated injection channel and into the evacuated repair area comprises positioning the three-way valve to establish fluid communication between the evacuated transfer channel and the evacuated injection channel.

5. The method of claim 1, wherein placing the repair patch over the repair area of the structure comprises placing a patch of pre-cured composite over the repair area of the structure.

6. The method of claim 1, wherein:
placing the repair patch over the repair area of the structure comprises placing a multi-layer patch over the repair area of the structure, the multi-layer patch having multiple layers separated by a plurality of bondline spacers,
the multiple layers of the multi-layer patch comprise layers of one or more of a sheet metal, a polymer, or a pre-cured composite, and
forcing adhesive through the evacuated injection channel and into the evacuated repair area further comprises forcing adhesive into the multi-layer patch between the multiple layers.

7. The method of claim 6, further comprising:
before sealing the repair patch and repair area with the vacuum bag, placing breather and release plies over the repair patch.

8. The method of claim 1, wherein forcing the adhesive through the evacuated injection channel and into the evacuated repair area comprises forcing a de-aerated adhesive through the evacuated injection channel and into the evacuated repair area.

9. The method of claim 1, wherein placing the repair patch over the repair area of the structure comprises placing the repair patch over a plurality of bondline spacers positioned between the repair patch and the structure and configured to maintain a desired gap between the repair patch and the structure.

10. The method of claim 1, wherein the vacuum bag comprises a float valve configured to prevent the adhesive from flowing into the seal ring.

11. The method of claim 1, further comprising:
detecting that the adhesive fills the repair area via a fill sensor disposed proximate to the seal ring.

12. The method of claim 11, wherein detecting that the adhesive fills the repair area via the fill sensor disposed proximate to the seal ring comprises detecting that the adhesive fills the repair area via a fill sensor selected from the group consisting of a radio frequency identification (RFID) tag configured to modulate frequency response based on the adhesive contacting the RFID tag, a piezo electric sensor configured to change a response as the adhesive moves toward the piezo electric sensor and based on the adhesive contacting the piezo electric sensor, a capacitive sensor configured to respond to adjacent adhesive, a conductive sensor configured to respond to adhesive wetting and resulting conductivity changes by contact, and a resistive sensor configured to respond to adhesive wetting and resulting resistance changes by contact.

13. The method of claim 1, further comprising:
before evacuating the repair area and the injection channel, attaching the adhesive injection apparatus to the repair-patch hole and sealing the adhesive injection apparatus against the vacuum bag with vacuum seal tape.

14. The method of claim 1, wherein sealing the repair patch and repair area with the vacuum bag comprises sealing the repair patch and the repair area with a vacuum bag having embedded in a plurality of heating elements.

15. The method of claim 14, further comprising:
after forcing the adhesive through the evacuated injection channel and into the evacuated repair area, heating the adhesive using the plurality of heating elements, wherein heating the adhesive at least partially cures the adhesive and repairs the repair area.

16. The method of claim 1, wherein the forcing of adhesive through the injection channel includes breaking a frangible seal.

17. An adhesive injection apparatus comprising:
a transfer channel configured to be fluidly coupled to an adhesive reservoir;
an injection channel configured to be fluidly coupled to a repair area;
an evacuation channel configured to be fluidly coupled to a vacuum source;
a seal actuation tube configured to be fluidly coupled to the evacuation channel and a seal ring around a periphery of a vacuum bag, wherein the vacuum bag is used to seal a repair patch and the repair area; and
a three-way valve disposed between the transfer channel, the injection channel, and the evacuation channel and selectively operable to establish fluid communication between the evacuation channel and the injection channel, between the evacuation channel and the transfer channel, and between the transfer channel and the injection channel.

18. The adhesive injection apparatus of claim 17, further comprising:
the adhesive reservoir.

19. The adhesive injection apparatus of claim 18, wherein the adhesive reservoir contains a de-aerated adhesive.

20. The adhesive injection apparatus of claim 18, further comprising:
   a frangible seal separating the adhesive reservoir from the transfer channel.

* * * * *